United States Patent
Marzban et al.

(10) Patent No.: US 12,362,843 B2
(45) Date of Patent: Jul. 15, 2025

(54) INTERFERENCE REPORTING FOR WIRELESS COMMUNICATIONS BASED ON MIXTURE DISTRIBUTIONS

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 547 days.

(21) Appl. No.: 17/841,328

(22) Filed: Jun. 15, 2022

(65) Prior Publication Data

US 2023/0412292 A1    Dec. 21, 2023

(51) Int. Cl.
*H04B 17/345* (2015.01)
*H04W 24/10* (2009.01)
*H04W 8/24* (2009.01)

(52) U.S. Cl.
CPC .......... *H04B 17/345* (2015.01); *H04W 24/10* (2013.01); *H04W 8/24* (2013.01)

(58) Field of Classification Search
CPC ....... H04B 17/345; H04W 24/10; H04W 8/24
See application file for complete search history.

(56) References Cited

U.S. PATENT DOCUMENTS

| | | |
|---|---|---|
| 2022/0038931 A1 | 2/2022 | Kuru et al. |
| 2022/0061014 A1 | 2/2022 | Sundararajan et al. |

FOREIGN PATENT DOCUMENTS

| | | | | |
|---|---|---|---|---|
| WO | WO-2022084457 A1 | * | 4/2022 | ............. G06N 20/00 |

OTHER PUBLICATIONS

Elkotby H., et al., "Interference Modeling for Cellular Networks Under Beamforming Transmission", IEEE Transactions on Wireless Communications, IEEE Service Center, Piscataway, NJ, US, vol. 16, No. 8, Aug. 1, 2017, pp. 5201-5217, XP011658688, Section C, p. 2.

Elkotby H., et al., "Mimo Cellular Networks Performance Under User-Assisted Relaying", IEEE Transactions on Wireless Communications, IEEE Service Center, Piscataway, NJ, US, vol. 17, No. 11, Nov. 1, 2018, pp. 7144-7158, XP011703144, Section C, p. 3.

International Search Report and Written Opinion—PCT/US2023/025117—ISA/EPO—Sep. 20, 2023.

* cited by examiner

*Primary Examiner* — Brenda H Pham
(74) *Attorney, Agent, or Firm* — Holland & Hart LLP

(57) ABSTRACT

Methods, systems, and devices for wireless communication are described. Some wireless communications systems may support interference reporting as a mixture distribution model. A user equipment (UE) may receive signals via one or more interference measurement resources. The UE may obtain interference measurements for a wireless communication channel based on the signals. The UE may transmit an interference report to a network entity that indicates a respective set of one or more distribution parameters for each probability distribution of a set of multiple probability distributions of the mixture distribution. Each probability distribution may correspond to a respective component of the mixture distribution. The network entity may schedule wireless communications with the UE based on the interference report and the mixture distribution.

27 Claims, 18 Drawing Sheets

INTERFERENCE REPORTING FOR WIRELESS COMMUNICATIONS BASED ON MIXTURE DISTRIBUTIONS

FIELD OF TECHNOLOGY

The following relates to wireless communication, including interference reporting based on mixture distributions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support interference reporting based on mixture distributions. For example, the described techniques provide for a wireless device, such as a user equipment (UE), to report interference as a mixture distribution model. A network entity may transmit signals to the UE via one or more interference measurement resources. The UE may measure the signals to obtain interference measurements for a wireless communication channel. The UE may estimate a distribution that is representative of the interference observed by the UE based on the interference measurements. The distribution may be a mixture distribution that includes one or more components (e.g., the mixture distribution may comprise a combination of multiple probability distributions, and the multiple probability distributions may collectively represent—and hence the mixture distribution may represent—the interference). A granularity of the distribution may be related to a quantity of the one or more components (e.g., how many individual probability distributions are collectively included in the mixture distribution).

The UE may transmit, to the network entity, an interference report that includes a respective set of one or more distribution parameters for each probability distribution of the mixture distribution, where the probability distributions may correspond to the components of the mixture distribution. For example, for a given probability distribution that is a component of the mixture distribution, the respective set of distribution parameters may define or otherwise describe the corresponding probability distributions—for example, the respective set of distribution may include a mean, a covariance matrix, a mixing probability (e.g., a weight to be allocated to the probability distribution when combining with one or more other probability distributions included in the mixture distribution), a scale, a shape, or any combination thereof for the corresponding probability distribution. Which distribution parameters are included in the interference report for each of the constituent probability distributions of the mixture distribution may be based on a mixture distribution reporting capability of the UE, a mixture distribution reporting configuration for the UE, a type of base distribution of the mixture distribution, or any combination thereof. The network entity may schedule wireless communications with the UE based on the interference report and the mixture distribution indicated therein.

A method for wireless communication at a UE is described. The method may include obtaining a set of multiple interference measurements for a wireless communication channel, transmitting an interference report that indicates a respective set of one or more distribution parameters for each probability distribution of a set of multiple probability distributions, where the set of multiple probability distributions are components of a mixture distribution that is representative of interference at the UE, and where the respective sets of one or more distribution parameters are based on the set of multiple interference measurements, and receiving one or more wireless communications based on the interference report and the mixture distribution.

An apparatus for wireless communication at a UE is described. The apparatus may include a processor, memory coupled with the processor, and instructions stored in the memory. The instructions may be executable by the processor to cause the apparatus to obtain a set of multiple interference measurements for a wireless communication channel, transmit an interference report that indicates a respective set of one or more distribution parameters for each probability distribution of a set of multiple probability distributions, where the set of multiple probability distributions are components of a mixture distribution that is representative of interference at the UE, and where the respective sets of one or more distribution parameters are based on the set of multiple interference measurements, and receive one or more wireless communications based on the interference report and the mixture distribution.

Another apparatus for wireless communication at a UE is described. The apparatus may include means for obtaining a set of multiple interference measurements for a wireless communication channel, means for transmitting an interference report that indicates a respective set of one or more distribution parameters for each probability distribution of a set of multiple probability distributions, where the set of multiple probability distributions are components of a mixture distribution that is representative of interference at the UE, and where the respective sets of one or more distribution parameters are based on the set of multiple interference measurements, and means for receiving one or more wireless communications based on the interference report and the mixture distribution.

A non-transitory computer-readable medium storing code for wireless communication at a UE is described. The code may include instructions executable by a processor to obtain a set of multiple interference measurements for a wireless communication channel, transmit an interference report that indicates a respective set of one or more distribution parameters for each probability distribution of a set of multiple probability distributions, where the set of multiple probability distributions are components of a mixture distribution that is representative of interference at the UE, and where the respective sets of one or more distribution parameters are based on the set of multiple interference measurements, and receive one or more wireless communications based on the interference report and the mixture distribution.

Some examples of the method, apparatuses, and non-transitory computer-readable medium described herein may further include operations, features, means, or instructions for transmitting a capability message that indicates a mixture distribution reporting capability of the UE, where transmitting the interference report that indicates the respective sets of one or more distribution parameters associated with the mixture distribution may be based on the mixture distribution reporting capability of the UE.

In some examples of the method, apparatuses, and non-transitory computer-readable medium described herein, transmitting the capability message may include operations, features, means, or instructions for transmitting an indication of one or more types of base distributions associated with the mixture distribution reporting capability of the UE, the one or more types of base distributions including a Gaussian distribution, an inverse Gaussian distribution, an inverse Weibull distribution, or any combination thereof, where each of the set of multiple probability distributions may be based on a type of base distribution included in the one or more types of base distributions indicated via the capability message.

In some examples of the method, apparatuses, and non-transitory computer-readable medium described herein, transmitting the capability message may include operations, features, means, or instructions for transmitting an indication of a maximum quantity of components within a single mixture distribution associated with the mixture distribution reporting capability of the UE, where a quantity of probability distributions within the set of multiple probability distributions may be less than or equal to the maximum quantity of components indicated by the capability message.

Some examples of the method, apparatuses, and non-transitory computer-readable medium described herein may further include operations, features, means, or instructions for receiving a control message including a mixture distribution reporting configuration for the UE, where transmitting the interference report that indicates the respective sets of one or more distribution parameters associated with the mixture distribution may be based on the mixture distribution reporting configuration.

In some examples of the method, apparatuses, and non-transitory computer-readable medium described herein, the mixture distribution reporting configuration indicates one or more types of base distributions for the mixture distribution, the one or more types of base distributions including a Gaussian distribution, an inverse Gaussian distribution, an inverse Weibull distribution, or any combination thereof and each of the set of multiple probability distributions associated with the interference report may be based on a type of base distribution included in the one or more types of base distributions indicated by the mixture distribution reporting configuration.

In some examples of the method, apparatuses, and non-transitory computer-readable medium described herein, the mixture distribution reporting configuration indicates a maximum quantity of components within a single mixture distribution and a quantity of probability distributions within the set of multiple probability distributions may be less than or equal to the maximum quantity of components indicated by the mixture distribution reporting configuration.

In some examples of the method, apparatuses, and non-transitory computer-readable medium described herein, the mixture distribution reporting configuration may indicate a minimum weight for a component of the mixture distribution, and transmitting the interference report may include operations, features, means, or instructions for transmitting, within each respective set of one or more distribution parameters in the interference report, a respective weight for a corresponding probability distribution of the set of multiple probability distributions, where the respective weight for each probability distribution of the set of multiple probability distributions may be greater than or equal to the minimum weight indicated by the mixture distribution reporting configuration.

Some examples of the method, apparatuses, and non-transitory computer-readable medium described herein may further include operations, features, means, or instructions for transmitting a message including a switching indication associated with a switch from a first type of base distribution to a second type of base distribution and transmitting a second interference report that indicates a respective second set of one or more second distribution parameters for each second probability distribution of a set of multiple second probability distributions associated with a second mixture distribution, where each of the set of multiple second probability distributions associated with the second interference report may be based on the second type of base distribution indicated by the switching indication.

In some examples of the method, apparatuses, and non-transitory computer-readable medium described herein, a type of a base distribution for the mixture distribution may be a Gaussian type and the respective set of one or more distribution parameters for each probability distribution of the set of multiple probability distributions may include a respective mean, a respective covariance matrix, a respective weight, or any combination thereof associated with the probability distribution.

In some examples of the method, apparatuses, and non-transitory computer-readable medium described herein, the respective covariance matrix may indicate an interference correlation across one or more dimensions, the one or more dimensions associated with antenna ports, antenna elements, time, frequency, or any combination thereof.

In some examples of the method, apparatuses, and non-transitory computer-readable medium described herein, a type of a base distribution for the mixture distribution may be an inverse Gaussian type and the respective set of one or more distribution parameters for each probability distribution of the set of multiple probability distributions may include a respective mean, a respective shape, a respective weight, or any combination thereof associated with the probability distribution.

In some examples of the method, apparatuses, and non-transitory computer-readable medium described herein, a type of a base distribution for the mixture distribution may be an inverse Weibull type and the respective set of one or more distribution parameters for each probability distribution of the set of multiple probability distributions may include a respective shape, a respective scale, a respective weight, or any combination thereof associated with the probability distribution.

A method for wireless communication at a network entity is described. The method may include transmitting a set of multiple signals via a set of multiple interference measurement resources for a wireless communication channel, receiving an interference report that indicates a respective set of one or more distribution parameters for each probability distribution of a set of multiple probability distributions, where the set of multiple probability distributions are components of a mixture distribution that is representative of interference at a UE, and where the respective sets of one or more distribution parameters are based on a set of multiple interference measurements of the set of multiple interference measurement resources, and transmitting one or more wireless communications based on the interference report and the mixture distribution.

An apparatus for wireless communication at a network entity is described. The apparatus may include a processor, memory coupled with the processor, and instructions stored in the memory. The instructions may be executable by the processor to cause the apparatus to transmit a set of multiple signals via a set of multiple interference measurement resources for a wireless communication channel, receive an interference report that indicates a respective set of one or more distribution parameters for each probability distribution of a set of multiple probability distributions, where the set of multiple probability distributions are components of a mixture distribution that is representative of interference at a UE, and where the respective sets of one or more distribution parameters are based on a set of multiple interference measurements of the set of multiple interference measurement resources, and transmit one or more wireless communications based on the interference report and the mixture distribution.

Another apparatus for wireless communication at a network entity is described. The apparatus may include means for transmitting a set of multiple signals via a set of multiple interference measurement resources for a wireless communication channel, means for receiving an interference report that indicates a respective set of one or more distribution parameters for each probability distribution of a set of multiple probability distributions, where the set of multiple probability distributions are components of a mixture distribution that is representative of interference at a UE, and where the respective sets of one or more distribution parameters are based on a set of multiple interference measurements of the set of multiple interference measurement resources, and means for transmitting one or more wireless communications based on the interference report and the mixture distribution.

A non-transitory computer-readable medium storing code for wireless communication at a network entity is described. The code may include instructions executable by a processor to transmit a set of multiple signals via a set of multiple interference measurement resources for a wireless communication channel, receive an interference report that indicates a respective set of one or more distribution parameters for each probability distribution of a set of multiple probability distributions, where the set of multiple probability distributions are components of a mixture distribution that is representative of interference at a UE, and where the respective sets of one or more distribution parameters are based on a set of multiple interference measurements of the set of multiple interference measurement resources, and transmit one or more wireless communications based on the interference report and the mixture distribution.

Some examples of the method, apparatuses, and non-transitory computer-readable medium described herein may further include operations, features, means, or instructions for receiving a capability message that indicates a mixture distribution reporting capability of the UE, where the respective sets of one or more distribution parameters associated with the mixture distribution may be based on the mixture distribution reporting capability of the UE.

In some examples of the method, apparatuses, and non-transitory computer-readable medium described herein, receiving the capability message may include operations, features, means, or instructions for receiving an indication of one or more types of base distributions associated with the mixture distribution reporting capability of the UE, the one or more types of base distributions including a Gaussian distribution, an inverse Gaussian distribution, an inverse Weibull distribution, or any combination thereof, where each of the set of multiple probability distributions may be based on a type of base distribution included in the one or more types of base distributions indicated via the capability message.

In some examples of the method, apparatuses, and non-transitory computer-readable medium described herein, receiving the capability message may include operations, features, means, or instructions for receiving an indication of a maximum quantity of components within a single mixture distribution associated with the mixture distribution reporting capability of the UE, where a quantity of probability distributions within the set of multiple probability distributions may be less than or equal to the maximum quantity of components indicated by the capability message.

Some examples of the method, apparatuses, and non-transitory computer-readable medium described herein may further include operations, features, means, or instructions for transmitting a control message including a mixture distribution reporting configuration for the UE, where the respective sets of one or more distribution parameters associated with the mixture distribution may be based on the mixture distribution reporting configuration.

Some examples of the method, apparatuses, and non-transitory computer-readable medium described herein may further include operations, features, means, or instructions for determining the mixture distribution reporting configuration based on a location of the UE within a cell, an interference pattern associated with the UE, a bandwidth available for interference reporting, or any combination thereof.

In some examples of the method, apparatuses, and non-transitory computer-readable medium described herein, the mixture distribution reporting configuration may indicate one or more types of base distributions for the mixture distribution, the one or more types of base distributions including a Gaussian distribution, an inverse Gaussian distribution, an inverse Weibull distribution, or any combination thereof and each of the set of multiple probability distributions associated with the interference report may be based on a type of base distribution included in the one or more types of base distributions indicated by the mixture distribution reporting configuration.

In some examples of the method, apparatuses, and non-transitory computer-readable medium described herein, the mixture distribution reporting configuration may indicate a maximum quantity of components within a single mixture distribution and a quantity of probability distributions within the set of multiple probability distributions may be less than or equal to the maximum quantity of components indicated by the mixture distribution reporting configuration.

In some examples of the method, apparatuses, and non-transitory computer-readable medium described herein, the mixture distribution reporting configuration may indicate a minimum weight for a component of the mixture distribution, and receiving the interference report may include operations, features, means, or instructions for receiving, within each respective set of one or more distribution parameters in the interference report, a respective weight for a corresponding probability distribution of the set of multiple probability distributions, where the respective weight for each probability distribution of the set of multiple probability distributions may be greater than or equal to the minimum weight indicated by the mixture distribution reporting configuration.

Some examples of the method, apparatuses, and non-transitory computer-readable medium described herein may further include operations, features, means, or instructions for receiving a message including a switching indication associated with a switch from a first type of base distribution to a second type of base distribution and receiving a second interference report that indicates a respective second set of one or more second distribution parameters for each second probability distribution of a set of multiple second probability distributions associated with a second mixture distribution, where each of the set of multiple second probability distributions associated with the second interference report may be based on the second type of base distribution indicated by the switching indication.

In some examples of the method, apparatuses, and non-transitory computer-readable medium described herein, a type of a base distribution for the mixture distribution may be a Gaussian type and the respective set of one or more distribution parameters for each probability distribution of the set of multiple probability distributions may include a respective mean, a respective covariance matrix, a respective weight, or any combination thereof associated with the probability distribution.

In some examples of the method, apparatuses, and non-transitory computer-readable medium described herein, a type of a base distribution for the mixture distribution may be an inverse Gaussian type or an inverse Weibull type and the respective set of one or more distribution parameters for each probability distribution of the set of multiple probability distributions may include a respective mean, a respective shape, a respective scale, a respective weight, or any combination thereof associated with the probability distribution.

DETAILED DESCRIPTION

Figure 1:
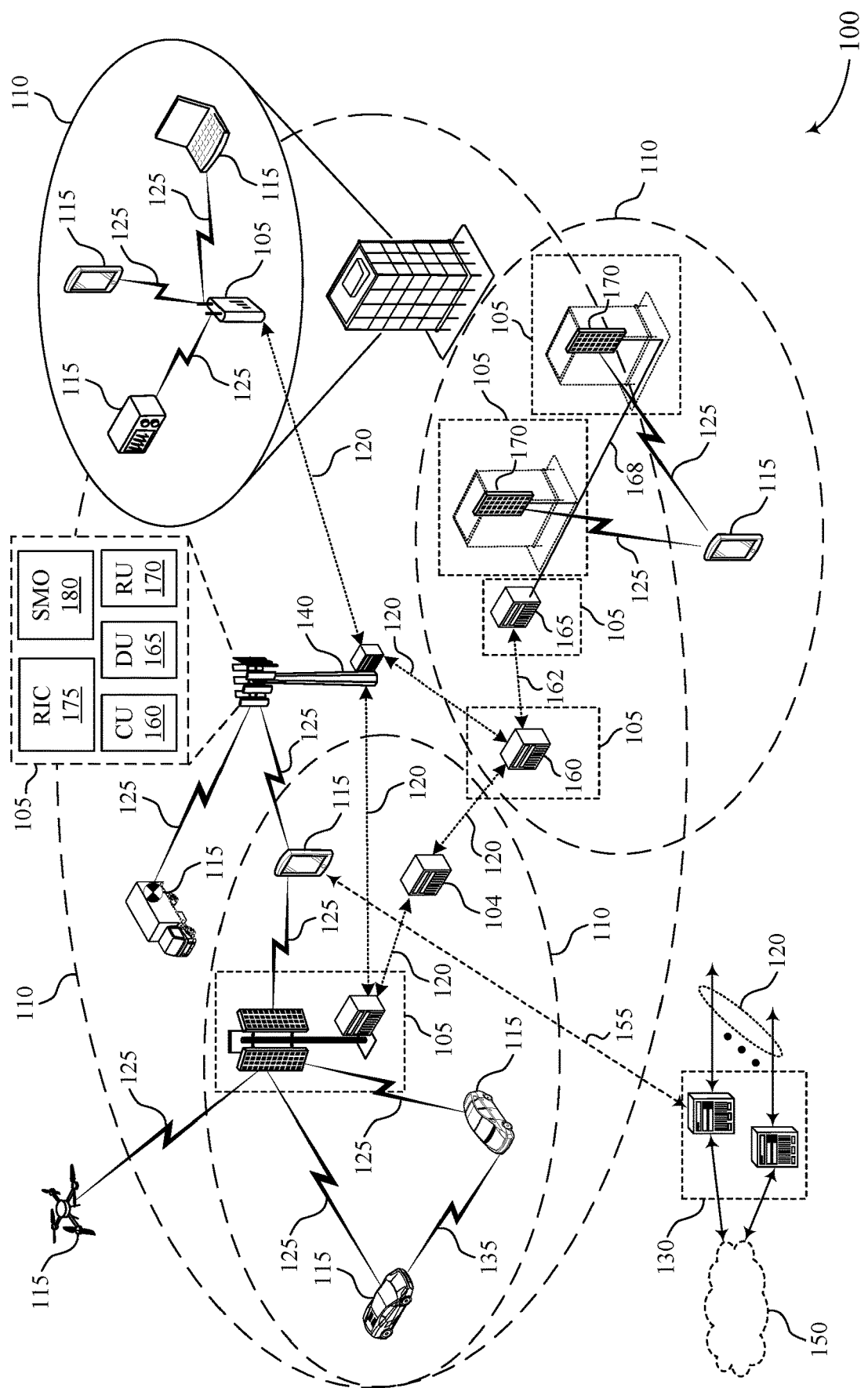
FIG. 1 illustrates an example of a wireless communications system that supports interference reporting based on mixture distributions in accordance with one or more aspects of the present disclosure.

Some wireless communications systems may support relatively flexible slot structures, such as mini-slots, reduced transmission burst sizes, flexible starting symbol positions, or the like. In these or other cases, distributions of interference experienced by different user equipments (UEs) within the wireless communications system may vary (e.g., models for estimating observed interference may be specific to a given UE). Improved interference reporting by a UE may improve throughput and reliability of communications between a network and multiple UEs each experiencing varying levels of interference. In some cases, a UE may report interference via a channel state feedback (CSF) report. For example, the UE may indicate channel metrics via the CSF report based on measurements of one or more interference measurement resources. However, the channel metrics in the CSF report may include combined metrics associated with both an estimated interference level and an estimated channel quality, and a network entity may not be able to differentiate effects of interference from effects of other channel conditions or parameters on the CSF report. Additionally, or alternatively, the CSF report may not indicate a distribution of the interference experienced by the UE.

Techniques, systems, and devices described herein provide for a UE to report interference experienced by the UE in the form of a mixture distribution model. The mixture distribution may include one or more components, each of which may be a probability distribution. The probability distributions in combination (e.g., a weighted combination thereof) may represent interference as observed by the UE. That is, a mixture distribution may represent interference at the UE as a combination (e.g., mixture) of multiple probability distributions (e.g., multiple Gaussian probability distributions or multiple other types of probability distributions). The UE may determine the probability distributions based on measurements of reference signals transmitted by a network entity via interference measurement resources in a wireless communication channel. For each probability distribution, the UE may identify and report one or more corresponding distribution parameters, such as a mean, a covariance, a mixing probability, a shape, or any combination thereof. Thus, an interference report as described herein may be configured to indicate a respective set of one or more distribution parameters for each probability distribution of a mixture distribution.

A network entity may receive the interference report and determine the mixture distribution representative of interference at the UE based on the respective sets of one or more distribution parameters. The network entity may adjust or maintain parameters for wireless communications with the UE based on the mixture distribution. The network entity may determine interference experienced by the UE with improved reliability and reduced complexity using the interference report configured to convey interference in the form of a mixture distribution model as compared with scenarios in which the network entity may receive a CSF report or some other report that includes combined channel metrics. Such techniques may improve scheduling decisions by the network entity, which may improve throughput of communications.

In some aspects, the UE may transmit a capability message that indicates a capability of the UE to support mixture distribution reporting for one or more types of distributions. The capability message may indicate a type of base distribution that is supported by the UE (e.g., a Gaussian distribution, an inverse Gaussian distribution, an inverse Weibull distribution), a maximum quantity of components within a single mixture distribution (e.g., a granularity of the interference reporting) that is supported by the UE, or both. Additionally, or alternatively, a network entity may transmit a control message that indicates a mixture distribution reporting configuration for the UE, and the type of the base distribution, the maximum quantity of components, or both may be based on the mixture distribution reporting capability.

Aspects of the disclosure are initially described in the context of wireless communications systems. Additional aspects are described with reference to interference distributions, covariance matrices, and process flows. Aspects of the disclosure are further illustrated by and described with reference to apparatus diagrams, system diagrams, and flowcharts that relate to interference reporting based on mixture distributions. Though examples herein may be described in the context of a UE performing interference reporting based on mixture distributions and transmitting such reports to a network entity, it is to be understood that the teachings herein may alternatively be applied to other types of wireless devices.

FIG. 1 illustrates an example of a wireless communications system 100 that supports interference reporting based on mixture distributions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless selfbackhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of the IAB donor may relay transmissions to UEs 115 through IAB nodes 104, and may directly signal transmissions to a UE 115. The CU 160 of the IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of the IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support interference reporting based on mixture distributions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may support relatively flexible slot structures (e.g., NR slot structures). For example, mini-slots may be allowed for URLLC, and relatively short bursts of transmission within a slot (e.g., a regular eMBB slot) may start at arbitrary symbol locations. Such flexibility may provide for variance in interference experienced at different UEs 115. Interference variations may, in some aspects, increase when a scheduling granularity decreases (e.g., interference variations using a scheduling granularity of a single slot may be less than variations using a scheduling granularity of a mini slot that includes four symbols). In some aspects, unscheduled uplink transmissions without a grant, relatively adaptive reference signal patterns, or both may be permitted, which may also affect variability of interference across devices in the wireless communications system 100. For example, adaptive patterns for transmission and reception of reference signals such as a demodulation reference signal (DMRS) and CSI-RS may depend on a quantity of antenna ports at a transmitting device, a quantity of antenna ports at a receiving device, a delay tolerance, a doppler spread, or any combination thereof.

In some aspects, interference variability across devices may be caused by one or more other factors, which may be referred to as interference parameters, such as location of a device within a cell (e.g., a cell-edge or cell-center device), beam-based transmissions between devices in the wireless communications system 100, traffic types, use cases, quantity of active UEs 115, a subcarrier spacing (SCS) of a neighboring network entity 105, a loading or resource utilization, a quantity of active beams (transmission configuration indicator (TCI) states), a scheduling scheme, or any combination thereof. For example, interference may fluctuate with beam changes, beam refinements, or the like. Additionally, or alternatively, an observed interference power at a cell-edge UE 115 may be different than an observed interference power at a cell-center UE 115. Thus, changes in one or more parameters of a device may change a behavior of observed interference at the device, and variations in interference behavior may increase as a quantity of changed interference parameters increases. Due to interference variances, a base distribution of interference may vary between devices in the wireless communications system 100. In such cases, it may be difficult to model the interference observed by multiple UEs 115 in the wireless communications system 100 using a single model (e.g., a well-parameterized model).

Each UE 115 may transmit a respective report to report interference experienced by the UE 115. The UEs 115 may measure the interference via one or more CSI-RSs or other reference signals transmitted via an interference measurement resource. In some cases, the report may be a CSF report including one or more channel metrics, such as a remote interference (RI) metric, a channel quality indicator (CQI) metric, a PMI, one or more other channel quality or interference metrics, or any combination thereof. The metrics reported via the CSF report may be combined metrics that may take the interference level experienced by the UE 115 and the channel estimation into account.

In some cases, however, the combined metrics may not provide sufficient information about an actual distribution of interference at the UE 115 for a network entity 105-a. For example, the combined metrics may, in some cases, report a mean and variance of a distribution of interference at the UE 115 (e.g., a Gaussian distribution), which may not be sufficient to accurately represent the interference. If a network entity 105 receives sufficient information to model an actual distribution of interference at a UE 115, the network entity 105 may utilize the interference distribution to make improved scheduling decisions (e.g., through a machine learning-based scheduler), to design reference signals for demodulation, or both, which may improve reliability and throughput of communications, among other advantages.

Techniques, systems, and devices described herein provide for a UE 115 or some other wireless device to report interference as a mixture distribution model, which may improve efficiency and reliability of interference reporting. For example, the UE 115 may receive reference signals via one or more interference measurement resources. The UE 115 may obtain interference measurements for a wireless communication channel based on the reference signals. The UE 115 may estimate a distribution that is representative of the interference observed by the UE 115 based on the interference measurements. As described herein, the distribution may be a mixture distribution that includes one or more components. The UE 115 may transmit an interference report to a network entity 105 that indicates a respective set of one or more distribution parameters for each probability distribution of the mixture distribution, where the probability distributions may correspond to the components of the mixture distribution. Each set of distribution parameters may include a mean, a covariance matrix, a mixing probability (e.g., weight), a scale, a shape, or any combination thereof associated with the respective probability distribution. The network entity 105 may schedule wireless communications with the UE 115 based on the interference report and the mixture distribution.

Figure 2:
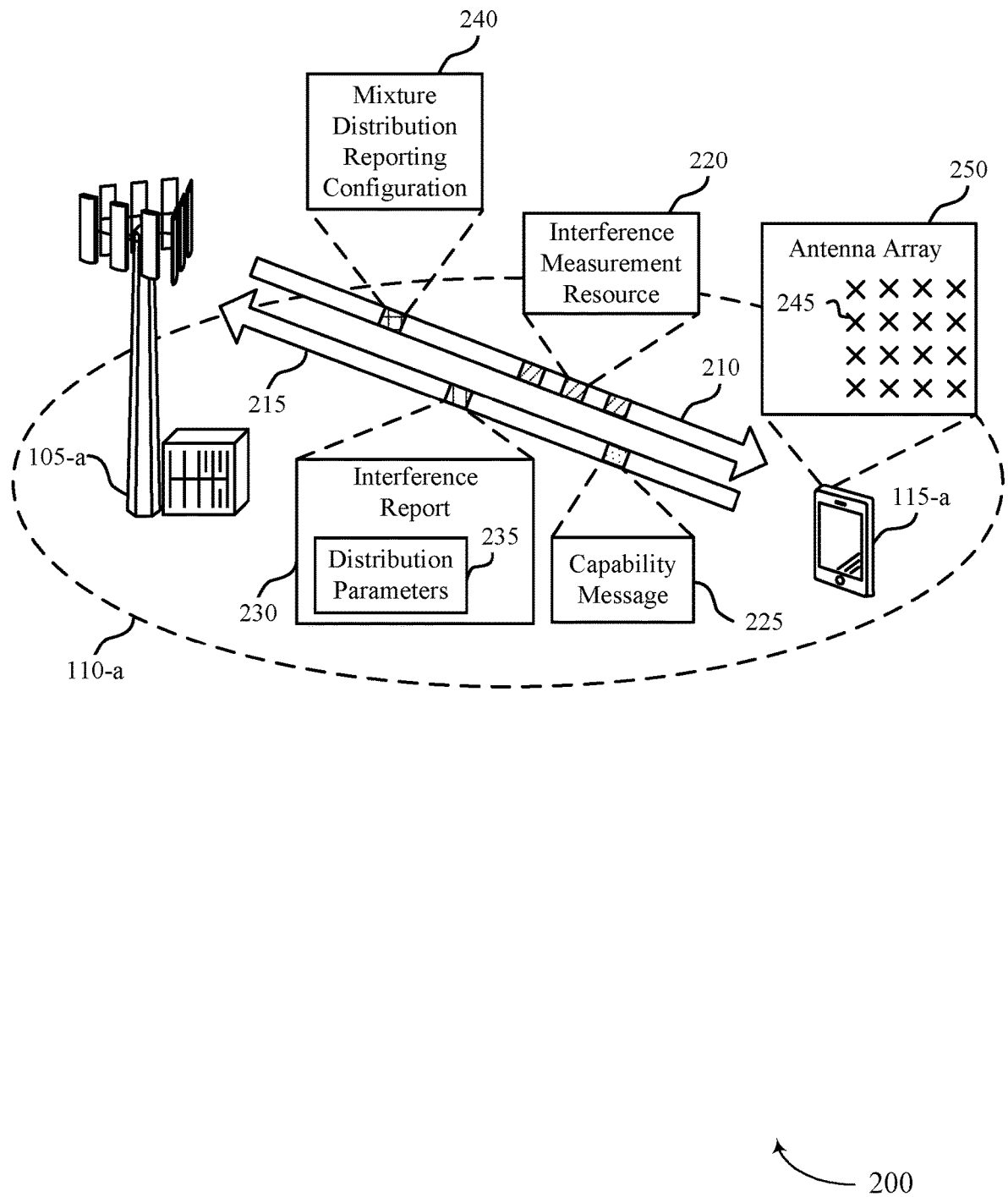
FIG. 2 illustrates an example of a wireless communications system that supports interference reporting based on mixture distributions in accordance with one or more aspects of the present disclosure.

FIG. 2 illustrates an example of a wireless communications system 200 that supports interference reporting based on mixture distributions in accordance with one or more aspects of the present disclosure. The wireless communications system 200 may implement or be implemented by aspects of the wireless communications system 100 as described with reference to FIG. 1. For example, the wireless communications system 200 may include a network entity 105-a and a UE 115-a, which may represent examples of a network entity 105 and a UE 115 as described with reference to FIG. 1. The network entity 105-a may communicate with the UE 115-a within a geographic coverage area 110-a and via a downlink communication link 210 and an uplink communication link 215. In some aspects, the UE 115-a may transmit an interference report 230 that indicates distribution parameters for a mixture distribution that represents interference at the UE 115-a.

In this example, the UE 115-a may support interference reporting as a mixture distribution. For example, the UE 115-a may be capable of generating a mixture distribution that is representative of or that provides a model of interference at the UE 115-a and reporting an indication of the mixture distribution to the network entity 105-a. The UE 115-a may, in some aspects, transmit a capability message 225 to the network entity 105-a to indicate the mixture distribution reporting capability of the UE 115-a. Additionally, or alternatively, the network entity 105-a may transmit a control message that indicates a mixture distribution reporting configuration 240 for the UE 115-a. The UE 115-a may transmit an interference report 230 that indicates one or more distribution parameters 235 associated with one or more components of a mixture distribution that represents interference at the UE 115-a based on the capability message 225, the mixture distribution reporting configuration 240, or both.

The UE 115-a may determine (e.g., calculate, estimate, or predict) the mixture distribution based on one or more interference measurements. The network entity 105-a may transmit reference signals or other signaling to the UE 115-a via one or more interference measurement resources 220 in the downlink communication link 210. The interference measurement resources 220 may be CSI-RS resources, channel state information interference measurement (CSI-IM) resources, some other types of interference measurement resources, or any combination thereof. The UE 115-a may measure the interference measurement resources 220 to obtain the interference measurements. The interference measurements may be representative of one or more metrics associated with interference experienced by the UE 115-a over time, frequency, and/or space. For example, the interference measurements may include measurements of interference measurement resources 220 across one or more slots or symbols, across one or more frequency bands, across one or more different antenna elements 245 of an antenna array 250 at the UE 115-a, or any combination thereof.

The UE 115-a may model the interference measurements obtained by the UE 115-a as a mixture of probability distributions, which may be referred to as a mixture distribution. The probability distributions may represent components of the mixture distribution (e.g., Gaussian components). A type of the probability distributions may be based on a type of a base distribution for the mixture distribution. The base distribution may be, for example, a Gaussian distribution, an inverse Gaussian distribution, an inverse Weibull distribution, or any combination thereof. In some aspects, the UE 115-a may indicate one or more types of base distributions supported by the UE 115-a via the capability message 225. Additionally, or alternatively, the network entity 105-a may indicate one or more types of the base distribution via the mixture distribution reporting configuration 240. The network entity 105-a may determine the type of base distribution based on previous knowledge of an interference pattern, based on a location of the UE 115-a in a cell (e.g., whether the UE 115-a is a cell-edge UE 115 or a cell-center UE 115), based on a bandwidth available for interference reporting in the network, or any combination thereof to reduce overhead.

In some aspects, the UE 115-*a* may transmit a message to the network entity 105-*a* to recommend switching a base distribution for reporting. For example, the UE 115-*a* may indicate a different type of base distribution than a previously indicated type of base distribution. The UE 115-*a* may dynamically switch types of base distributions based on the message. A type of each probability distribution in the mixture distribution may be based on at least one of the base types indicated via the capability message 225, the mixture distribution reporting configuration 240, or both.

In some aspects, the mixture distribution may model interference previously experienced by the UE 115-*a*. For example, the UE 115-*a* may estimate or calculate the mixture distribution based on a distribution of previously obtained interference measurements. Additionally, or alternatively, the mixture distribution may predict interference that may be experienced by the UE 115-*a* in one or more future time or frequency resources. For example, the UE 115-*a* may utilize a machine learning algorithm or some other type of prediction algorithm to predict interference on future time and frequency resources. The predicted interference may be based on one or more previously obtained interference measurements, one or more other metrics associated with communications at the UE 115-*a*, or both.

The UE 115-*a* may transmit the interference report 230 to the network entity 105-*a* to indicate the interference experienced by the UE 115-*a*, to indicate predictions of future interference at the UE 115-*a*, or both based on the mixture distribution. For example, the UE 115-*a* may indicate, via the interference report 230, one or more sets of distribution parameters 235. Each set of distribution parameters 235 may be associated with or may be used to indicate or model a respective probability distribution, and each probability distribution may represent a component of the mixture distribution. As such, the distribution parameters 235 indicated via the interference report 230 may be used to model interference experienced by the UE 115-*a* in the form of a mixture distribution. The interference report 230 may indicate parameters for modeling interference previously experienced by the UE 115-*a*, for modeling predicted interference, or both. If the UE 115-*a* reports distribution parameters associated with a mixture model that predicts interference on futures resources, the interference reporting may be referred to as predicted interference distribution reporting.

A set of distribution parameters 235 for a given probability distribution may include, for example, a mean of the probability distribution, a variance or covariance matrix associated with the probability distribution, a mixing probability to be applied to the probability distribution, a shape of the probability distribution, a scale of the probability distribution, or any combination thereof. The types of distribution parameters 235 in each set may be based on a type of the corresponding probability distribution. In some aspects, if the UE 115-*a* reports a multi-dimensional mixture distribution, the UE 115-*a* may indicate a covariance matrix, an auto-correlation function, or both associated with one or more components of the mixture distribution across the multiple dimensions.

The auto-correlation function, the covariance matrix, or both may indicate a correlation between interference measurements across space, time, or frequency. For example, there may be a correlation between interference experienced at a first antenna element 245 of the antenna array 250 at the UE 115-*a* and a second antenna element 245 of the antenna array 250 at the UE 115-*a*. An antenna element 245 may represent an example of a physical antenna or an antenna port. The UE 115-*a* may estimate the correlation between antenna elements 245, between frequency sub-bands, or both over a period of time. The UE 115-*a* may indicate the correlation via a covariance matrix, an auto-correlation function, or both in the interference report 230. By reporting the estimated correlation between antenna elements 245, between frequency bands, or both, the UE 115-*a* may transmit distribution parameters 235 associated with a single mixture distribution of a single antenna element 245 or frequency band, and the network entity 105-*a* may determine the interference at one or more other antenna elements 245 or frequency bands based on the correlation information. Examples of mixture distributions and corresponding distribution parameters 235 are described in further detail elsewhere herein, including with reference to FIGS. 3A and 3B.

The UE 115-*a* may indicate, via the interference report 230, a quantity of sets of distribution parameters 235 for a quantity of corresponding components of a mixture distribution. Assuming an unlimited number of components in a mixture distribution, a mixture distribution may theoretically model any non-bounded distribution. In practice, however, a set of one or more components may be used to represent most interference distributions. As the quantity of components in the mixture distribution increases, a granularity of the interference reporting may increase and an accuracy of the mixture distribution may increase. For example, a mixture distribution that includes a relatively large quantity of components may model interference at the UE 115-*a* with a relatively high degree of accuracy (e.g., precision). An increase in the quantity of components may correspond to an increased quantity of distribution parameters 235 that may be indicated via a given interference report 230, which may increase overhead and complexity. Accordingly, it may be beneficial to balance granularity of the interference reporting with accuracy to improve throughput.

In some aspects, the quantity of components in the mixture distribution may be based on a mixture distribution reporting capability of the UE 115-*a*. For example, the UE 115-*a* may support up to a maximum quantity of components within a single mixture distribution. The UE 115-*a* may indicate the maximum quantity of components via the capability message 225. Additionally, or alternatively, the quantity of components in the mixture distribution may be based on the mixture distribution reporting configuration 240. For example, the network entity 105-*a* may indicate the maximum quantity of components to the UE 115-*a* via the mixture distribution reporting configuration 240. The network entity 105-*a* may determine the maximum quantity of components based on a location of the UE 115-*a* in the geographic coverage area 110-*a* or one or more other parameters associated with the UE 115-*a* (e.g., to reduce reporting overhead). The maximum quantity of components may be configured to balance reporting overhead and accuracy of the corresponding interference distribution. A first quantity of sets of distribution parameters 235 for a corresponding first quantity of components that are included in the interference report 230 may be the same as or less than the maximum quantity of components indicated via the capability message 225, the mixture distribution reporting configuration 240, or both.

The network entity 105-*a* may receive the interference report 230 and determine the mixture distribution (e.g., an approximation of the mixture distribution) based on the distribution parameters. A granularity of the mixture distribution determined by the network entity 105-*a* may be based on a quantity of components for which distribution parameters are indicated via the interference report 230. The mixture distribution may be representative of the interference experienced by the UE 115-*a* (e.g., the actual interference, as compared with a combined metric).

The network entity 105-*a* may utilize the mixture distribution to make scheduling decisions (e.g., through a machine learning-based scheduler) or to design reference signals for demodulation. For example, the mixture distribution may indicate a time, a frequency, or a quantity of resources over which the UE 115-*a* may experience relatively high interference. The network entity 105-*a* may refrain from scheduling transmissions to and from the UE 115-*a* at the identified time or within the identified frequency or resources based on the interference being relatively high. In some aspects, the network entity 105-*a* may use a machine learning algorithm to predict time and frequency resources over which interference may be relatively high based on the mixture distribution. The network entity 105-*a* may schedule communications to and from the UE 115-*a* in resources associated with interference below a threshold based on the mixture distribution, which may improve throughput and reliability of communications.

Additionally, or alternatively, the network entity 105-*a* may increase a density of reference signals transmitted via the interference measurement resources 220 based on the mixture distribution, which may provide for the UE 115-*a* to obtain more interference measurements for reducing or mitigating effects of interference. The network entity 105-*a* may determine a density of reference signals that may balance throughput of data and other communications with accuracy of interference measurements by the UE 115-*a*.

The wireless communications system 200 may thereby support interference reporting as a mixture distribution, which may improve throughput and reliability of communications. Examples of mixture distributions are illustrated and described in further detail with reference to FIGS. 3A and 3B.

Figure 3A:
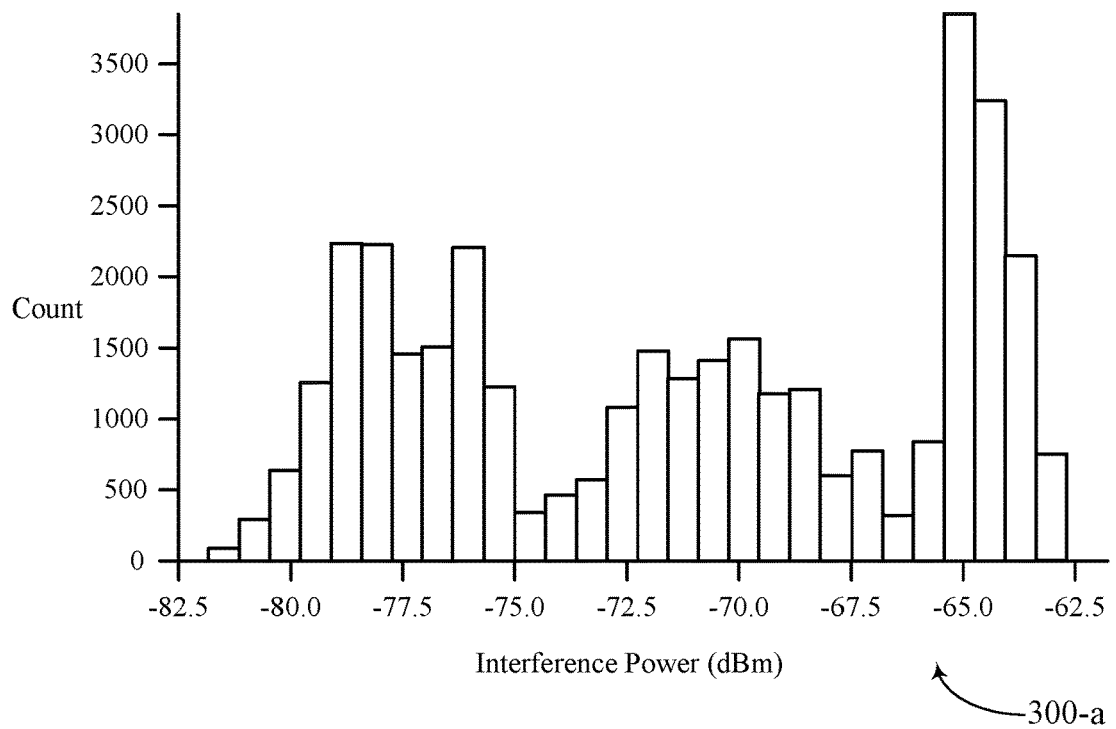
FIGS. 3A and 3B illustrate examples of interference distributions that support interference reporting based on mixture distributions in accordance with one or more aspects of the present disclosure.
Figure 3B:
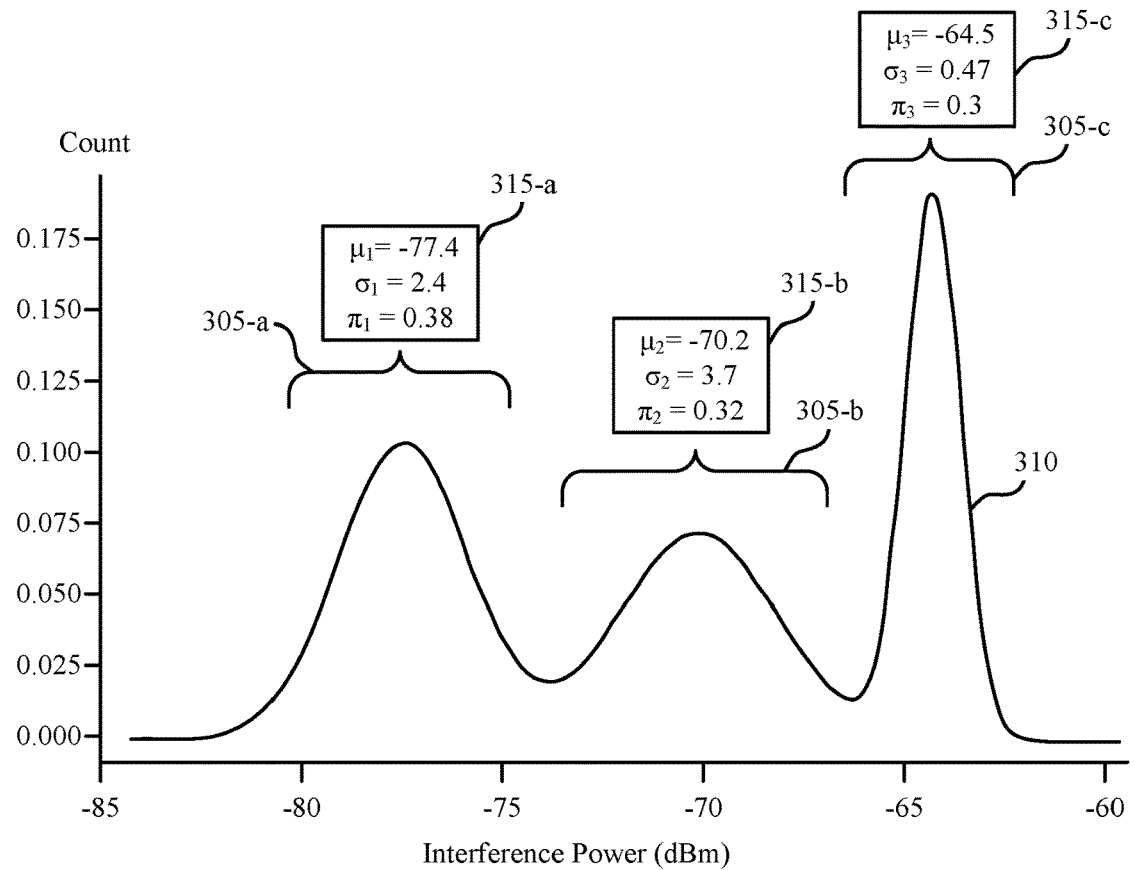

FIGS. 3A and 3B illustrate examples of interference distributions 300 that support interference reporting based on mixture distributions in accordance with one or more aspects of the present disclosure. The interference distributions 300 may implement aspects of the wireless communications systems 100 or 200 described with reference to FIGS. 1 and 2. For example, the interference distributions 300 may represent examples of mixture distributions generated by a UE 115 and reported to a network entity 105, which may represent examples of corresponding devices as described with reference to FIGS. 1 and 2. In this example, the UE 115 may obtain interference measurements over a relatively long period of time (e.g., a threshold quantity of seconds, slots, or symbols). The UE 115-*a* may estimate a mixture distribution that represents interference at the UE 115-*a* based on the interference measurements.

FIG. 3A illustrates an example of a first interference distribution 300-*a*. The first interference distribution 300-*a* illustrates a distribution of quantities of samples of measurements of interference power in decibels per minute (dBm). The Y-axis of the interference distribution 300-*a* may represent a count or a quantity of samples. The X-axis of the interference distribution 300-*a* may represent interference power levels. The interference distribution 300-*a* may thereby represent how many samples of each interference power level were measured by the UE 115 within a time period. For example, within the time period represented by the interference distribution 300-*a*, the UE 115 may measure around 700 samples of interference having a power level of around −80.0 dBm (e.g., within a range of power levels around −80.0 dBm). In some aspects, the quantity of samples represented by the count may correspond to a quantity of measurements of respective slots, symbols, or interference measurement resources that were previously measured by the UE 115 within the time period.

In some other aspects, as described with reference to FIG. 2, the UE 115 may predict an interference distribution 300 on future resources (e.g., using an artificial intelligence (AI)-based approach). For example, the UE 115 may predict, based on a machine learning algorithm or some other prediction technique, that the UE 115 will experience interference according to the probabilities modeled by the interference distribution 300 over a subsequent time period. In the example of FIG. 3A, if the interference distribution 300-*a* is used to predict interference, the UE 115 may predict that a quantity of samples of interference having a power level of around −65.0 dBm will be above 3500 samples. In other words, the UE 115 may predict that more than 3500 slots, symbols, or interference measurement resources may include interference having a power level of around −65.0 dBm over a subsequent time period.

FIG. 3B illustrates an example of a second interference distribution 300-*b*. The interference distribution 300-*b* may represent a mixture distribution 310 (e.g., a fitted function or a curve) generated by a UE 115 based on the interference measurements illustrated in the first interference distribution 300-*a*. For example, the UE 115 may fit the observed interference samples illustrated in FIG. 3A to a curve estimate a distribution of the interference. In some aspects, the UE 115 may fit the interference samples to a mixture distribution 310 based on an expectation maximization (EM) algorithm, or some other type of algorithm that provides for the UE 115 to estimate one or more distribution parameters 315 for each component of the mixture distribution 310. That is, the second interference distribution 300-*b* may be a fitted mixture distribution 310 using three components 305 (e.g., probability distributions).

In the example of FIG. 3B, each of the components 305 may be Gaussian components. That is, a type of base distribution for the mixture distribution 310 may be Gaussian. Although a Gaussian distribution is illustrated in FIG. 3B, it is to be understood that any other type of interference distribution 300 may be used. For example, the UE 115 may generate a mixture distribution 310 based on a Gaussian type, an inverse Gaussian type, an inverse Weibull type, some other type of interference distribution 300, or any combination thereof.

A mixture distribution generated by the UE 115 may consist of several components 305, and each component may be identified by $k \in \{1, \ldots, K\}$, where K may be the quantity of components 305. A Gaussian mixture distribution may represent any non-bounded distribution. A quantity of components 305 in the mixture distribution 310 may be the same as or less than a maximum quantity of components 305 indicated via a mixture distribution capability of the UE 115, a mixture distributing reporting configuration, or both, as described with reference to FIG. 2. In the example of FIG. 3B, there may be three components 305 in the mixture distribution 310 (e.g., K=3). The interference distribution (p(X)) may then be given by a weighted summation of the components 305, such as $p(X) = \Sigma_{k=1}^{K} \pi_k \mathbb{G}(X|\mu_k, \Sigma_k)$.

Each component 305 may include or be modeled according to one or more distribution parameters 315, which may represent an example of the distribution parameters 235 described with reference to FIG. 2. For example, the set of distribution parameters 315-a may represent characteristics of the component 305-a, the set of distribution parameters 315-b may represent characteristics of the component 305-b, and the set of distribution parameters 315-c may represent characteristics of the component 305-c. If the type of the base distribution is inverse Gaussian, the distribution parameters 315 may include a mean, a shape parameter (e.g., a shape of the respective inverse Gaussian probability distribution), or both. If the type of the base distribution is inverse Weibull, the distribution parameters 315 may include a shape parameter, a scale parameter, or both. In some aspects, inverse Gaussian distributions, inverse Weibull distributions, or both may represent high tail distributions more efficiently and accurately than Gaussian distributions.

If the type of the base distribution is Gaussian, as illustrated in FIG. 3B, each Gaussian component 305 may include or be modeled according to one or more of a mean ($\mu_k$), a covariance matrix ($\Sigma_k$), a variance ($\sigma_k$), and a mixing probability ($\pi_k$). A mean of each component 305 may be a median or middle point of the component 305. For example, the mean of the component 305-a may be around −77.4 dBm, as this may be a median or middle interference power level of a range of interference power levels represented by the component 305-a. The mean of the component 305-b may be around −70.2 and the mean of the component 305-c may be around −64.5. The variance of a component 305 may represent how wide the component 305 is (e.g., a range of samples over time), such as a range of interference power levels over which the component 305 extends.

Each component 305 of a Gaussian distribution may be assigned a respective mixing probability. The mixing probability may indicate a weight to be applied to the respective component 305 relative to other components 305 in the mixture distribution 310. For example, the mixture distribution 310 may be a weighted summation of the components 305, and the components 305 may be weighted based on the mixing probabilities. Each of the mixing probabilities may sum to one (e.g., $\Sigma_{k=1}^{K}\pi_k=1$). In the example of FIG. 3B, the component 305-a may be assigned a greater weight than the components 305-b and 305-c. For example, the mixing probability of the component 305-a may be 0.38. The mixing probabilities of the components 305-b and 305-c may be 0.32 and 0.30, respectively.

In some aspects, the mixing probability may be assigned based on a variance of a component 305, a size or range of the component, or both. For example, if a fourth component 305 is included in the mixture distribution 310 to represent the distribution of interference between −68.0 dBm and −66.0 dBm, the fourth component may be relatively small (e.g., may include relatively few counts), and the mixing probability assigned to the fourth component may be less than the mixing probabilities assigned to the other components accordingly. In some aspects, the mixing probabilities may be based on a mixture distribution reporting capability of the UE 115, a mixture distribution reporting configuration, or both. For example, one or both of the mixture distribution reporting capability and the mixture distribution reporting configuration may indicate a minimum weight for a component 305 of the mixture distribution 310. In such cases, each set of distribution parameters 315 for each component 305 may include a respective weight that is the same as or greater than the minimum weight.

The mixture distribution 310 is illustrated across a single dimension in FIG. 3B. For example, the mixture distribution 310 represents a distribution of interference measurements over time. The mixture distribution 310 may be applicable to or associated with interference measurements at a single antenna element of the UE 115 (e.g., physical antenna or antenna port) and a single frequency band (e.g., subcarrier). In this example, the distribution parameters 315 for each component may include a variance matrix, which may represent a range or width of the component 305 over time (e.g., correlation between time samples). However, it is to be understood that a mixture distribution 310 may be generated across multiple dimensions, such as time, frequency, space, or any combination thereof. For example, a mixture distribution 310 may represent a distribution of interference measurements across time, frequencies, and antenna elements. If the mixture distribution 310 is multi-dimensional, the distribution parameters 315 for each component 305 may include a covariance matrix, an auto-correlation function, or both.

The covariance matrix for a given component 305 may include correlation information associated with the component 305 in one or more dimensions. For example, an entry in the covariance matrix may indicate a correlation between interference across time, frequency, space (e.g., antenna elements), or any combination thereof. The correlation information included in the covariance matrix is described in further detail elsewhere herein, including with reference to FIG. 4.

In some aspects, the interference at the UE 115 may vary randomly over time, and the variance parameter, entries in the covariance matrix, or both may indicate correlation between samples over time. In some other aspects, the observed interference at the UE 115 may vary periodically over time, such that the UE 115 may determine correlation across time based on the periodicity (e.g., $\tau$). For example, interference at a first time, t, may be correlated (e.g., relatively similar to) interference at a second time, t+$\tau$. If the mean function and correlation function of an interference distribution change by shifts over time or frequency, the distribution may be referred to as a wide sense stationary random processes.

If the interference measurements at the UE 115 are in the form of a wide sense stationary process in time and frequency, the UE 115 may determine correlation based on a time period, $\tau$. In such cases, the UE 115 may report an autocorrelation function based on the time period and the variance, and the UE 115 may refrain from reporting a covariance matrix. The autocorrelation function may be represented by $R(\tau)=E(x_n x^*_{n+\tau})$, where $x_n$ may be the estimated or predicted interference at time n, and $\tau$ may be the time period. The UE 115 may determine correlation across time and frequency based on the time period instead of entries in a covariance matrix.

A UE 115 as described herein may thereby generate a mixture distribution 310 that is made up of a combination of one or more components 305 that represent interference at the UE 115 over time, over one or more frequency subbands, over one or more antenna elements of the UE 115, or any combination thereof. The UE 115 may transmit an interference report that indicates a respective set of distribution parameters 315 for each component 305 of the mixture distribution 310. A network entity 105 may use the interference report to schedule wireless communications with the UE 115, which may improve throughput and reliability of communications.

Figure 4:
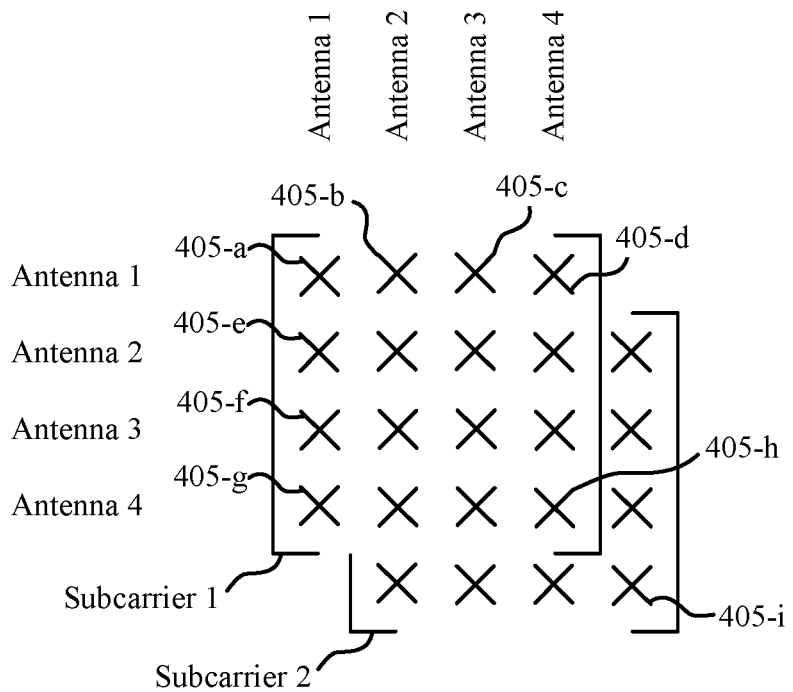
FIG. 4 illustrates an example of a covariance matrix that supports interference reporting based on mixture distributions in accordance with one or more aspects of the present disclosure.

FIG. 4 illustrates an example of a covariance matrix 400 that supports interference reporting based on mixture distributions in accordance with one or more aspects of the present disclosure. The covariance matrix 400 may implement or be implemented by aspects of the wireless communications systems 100 and 200 or the interference distributions 300 described with reference to FIGS. 1-3. For example, the covariance matrix 400 may represent an example of a covariance matrix associated with a probability distribution, as described with reference to FIG. 3B. A UE 115 may indicate the covariance matrix 400 as a distribution parameter in an interference report. The UE 115 and the network entity 105 may represent examples of corresponding devices as described with reference to FIGS. 1-3.

The covariance matrix 400 may include one or more entries 405 across one or more dimensions. Each entry 405 may include correlation information that defines a correlation of a corresponding probability distribution across antennas, time samples, or frequencies. A covariance matrix 400 may be estimated for each component or probability distribution of a mixture distribution, such as for each component 305 of the mixture distribution 310 illustrated in FIG. 3B. That is, each component of a mixture distribution may be associated with different interference correlation information across one or more dimensions.

The covariance matrix 400 illustrated in FIG. 4 may be a four by four by two matrix. However, it is to be understood that a covariance matrix 400 may be any size in any quantity of one or more dimensions. The size of the matrix and the quantity of dimensions of the matrix may be based on a quantity of antenna elements of an antenna array at the UE 115 and a quantity of frequency bands over which the UE 115 reports interference. In this example, the UE 115 may include four antenna elements and may report interference on two frequency bands. A first submatrix within the covariance matrix 400 may be associated with a first frequency (Subcarrier 1) and a second submatrix within the covariance matrix 400 may be associated with a second frequency (Subcarrier 2).

Within each submatrix, the entries on the diagonal of the matrix (e.g., starting with entry 405-$a$ and ending with entry 405-$h$ in the first submatrix) may include a variance of the interference on each antenna element (e.g., variance information in a time domain, as described with reference to FIG. 3). For example, the entry 405-$a$ may include a variance of interference at a first antenna element (Antenna 1) over time, and the entry 405-$h$ may include a variance of interference at a fourth antenna element (Antenna 4) over time. Other entries 405 may include information that indicates an interference correlation between two antenna elements over time. For example, the entry 405-$b$ may indicate an interference correlation between Antenna 1 and a second antenna element (Antenna 2). The entry 405-$c$ may indicate an interference correlation between Antenna 1 and a third antenna element (Antenna 3). The entry 405-$d$ may indicate an interference correlation between Antenna 1 and Antenna 4. An antenna element as described herein may represent a physical antenna of the UE 115, an antenna port of the UE 115, or some other component of an antenna array.

The entries 405 may be symmetrical around the diagonal of the submatrix. For example, the entry 405-$e$ may be identical to the entry 405-$b$ and may indicate an interference correlation between Antenna 1 and Antenna 2. The entry 405-$f$ may be identical to the entry 405-$c$, and the entry 405-$g$ may be identical to the entry 405-$d$. Thus, the entries 405 in the covariance matrix 400 may provide interference correlation information between each antenna element of the UE 115 over time. If interference on a first antenna element is relatively high when interference at a second antenna element is relatively high, the correlation information between the antenna elements may indicate a high correlation. If interference on the first antenna element is relatively low at the same time that interference on the second antenna element is relatively high, the correlation information between the antenna elements may indicate a low correlation.

The entries 405 may additionally, or alternatively, indicate correlation information across frequencies. For example, the UE 115 may measure interference on a first subcarrier (Subcarrier 1), and the UE 115 may determine how much the interference is correlated with a second subcarrier (Subcarrier 2) based on the correlation information in the covariance matrix 400. In such cases, entries 405 across different submatrices within the covariance matrix may indicate correlation information between the Subcarrier 1 and the Subcarrier 2. For example, the entry 405-$i$ in a second submatrix associated with Subcarrier 2 may include correlation information associated with an interference correlation between the Subcarrier 1 and the Subcarrier 2 in addition to variance information associated with the Antenna 4 over time.

As described with reference to FIG. 3B, if the interference can be represented as a wide sense stationary random process in time and frequency, the UE 115 may determine an autocorrelation function that represents the interference correlation over one or more dimensions. In other aspects, when generating a mixture distribution that represents interference at a UE 115, the UE 115 may determine a covariance matrix 400 for each component of the mixture distribution. As described herein, the UE 115 may transmit an indication of the covariance matrix 400 for each component via an interference report. A network entity 105 may utilize the indicated covariance matrices 400, among other distribution parameters indicated via the interference report, to estimate interference experienced by the UE 115 at different times, frequencies, and antenna elements. The network entity 105 may schedule wireless communications with the UE 115 based on the estimated interference, which may improve communication reliability.

Figure 5:
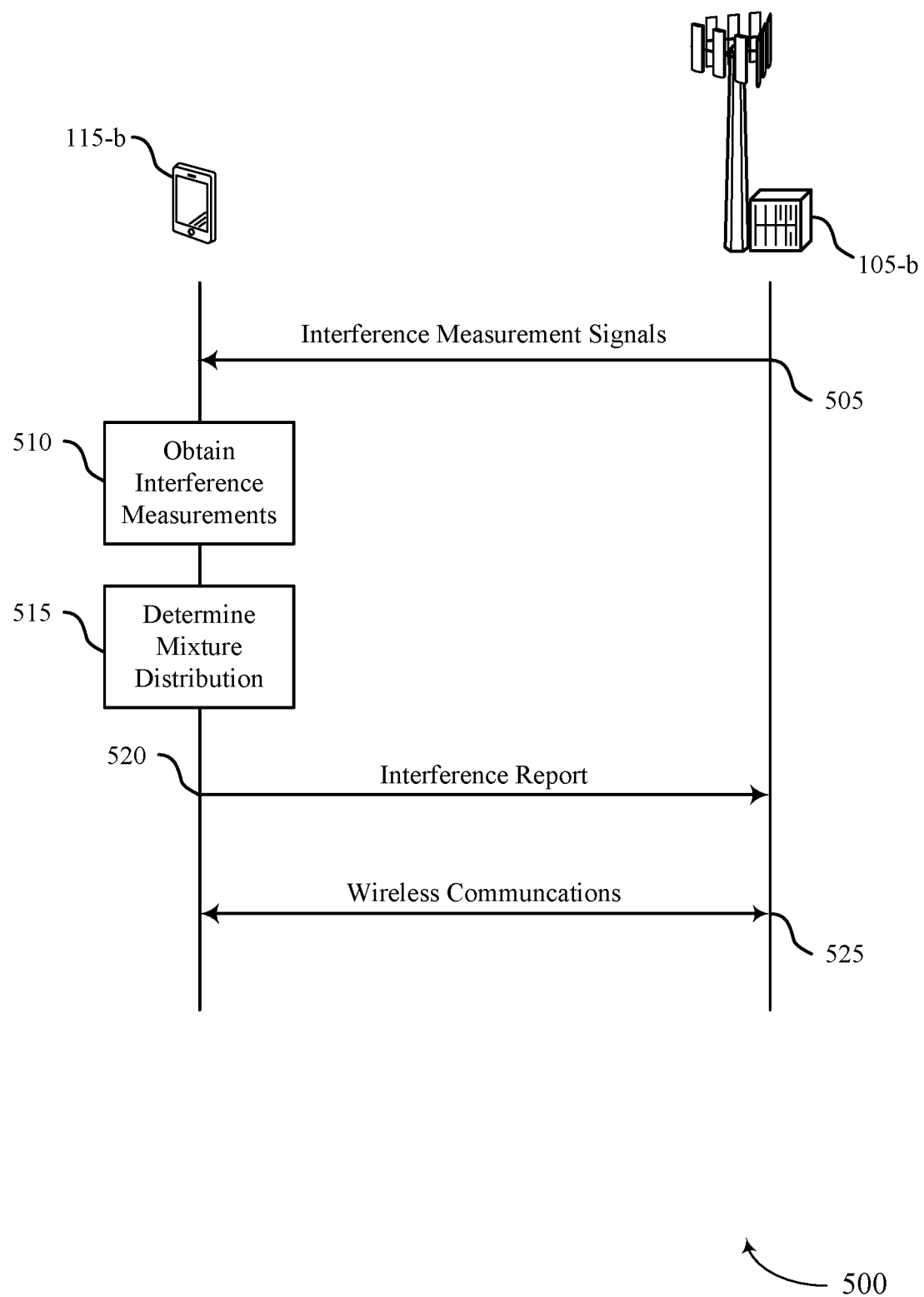
FIG. 5 illustrates an example of a process flow that supports interference reporting based on mixture distributions in accordance with one or more aspects of the present disclosure.

FIG. 5 illustrates an example of a process flow 500 that supports interference reporting based on mixture distributions in accordance with one or more aspects of the present disclosure. The process flow 500 may implement or be implemented by aspects of the wireless communications systems 100 and 200 described with reference to FIGS. 1 and 2. For example, the process flow 500 illustrates interference reporting between a UE 115-$b$ and a network entity 105-$b$, which may represent aspects of corresponding devices as described with reference to FIGS. 1-4. In some aspects, the UE 115-$b$ may transmit an interference report that indicates a respective set of distribution parameters for one or more components of a mixture distribution that represents interference at the UE 115-$b$.

In the following description of the process flow 500, the operations between the UE 115-$b$ and the network entity 105-$b$ may be performed in different orders or at different times. Some operations may also be left out of the process flow 500, or other operations may be added. Although the UE 115-$b$ and the network entity 105-$b$ are shown performing the operations of the process flow 500, some aspects of some operations may also be performed by one or more other wireless devices.

At 505, the network entity 105-$b$ may transmit signals via one or more interference measurement resources for a wireless communication channel between the UE 115-$b$ and the network entity 105-$b$. The signals may include reference signals, such as CSI-RSs, or other types of interference measurement signals.

At 510, the UE 115-$b$ may obtain interference measurements for the wireless communications channel based on measuring the signals received via the interference measurement resources. The interference measurements may include interference power measurements, or other types of interference measurements.

At 515, in some aspects, the UE 115-b may determine (e.g., estimate, calculate, predict, or generate) a mixture distribution that is representative of interference at the UE 115-b based on the interference measurements obtained at 510. The mixture distribution may include or be made of a set of multiple probability distributions, which may be components of the mixture distribution. The mixture distribution may represent interference experienced by the UE 115-b, predicted interference at the UE 115-b in one or more future time and frequency resources, or both. The mixture distribution may represent an example of a mixture distribution 310 as described with reference to FIG. 3B. In some aspects, the UE 115-b may estimate the mixture distribution based on an EM algorithm, as described with reference to FIG. 3B.

At 520, the UE 115-b may transmit an interference report to the network entity 105-b. The interference report may indicate a respective set of one or more distribution parameters for each probability distribution of the set of multiple probability distributions (e.g., for each component) of the mixture distribution. In some aspects, the UE 115-b may support a mixture distribution reporting capability, and transmitting the interference report may be based on the mixture distribution reporting capability. Additionally, or alternatively, the network entity 105-b may transmit a control message to the UE 115-b that indicates a mixture distribution reporting configuration for the UE 115-b, and transmitting the interference report may be based on the mixture distribution reporting configuration.

The distribution parameters in each set may be based on the mixture distribution reporting capability of the UE 115-b, the mixture distribution reporting configuration, a type of base distribution for the mixture distribution, or any combination thereof. If the mixture distribution is a Gaussian type, the distribution parameters for a probability distribution may include a mean, a covariance matrix, a variance, an auto-correlation function, a respective weight, or any combination thereof associated with the probability distribution. If the mixture distribution is an inverse Gaussian type, the distribution parameters for a probability distribution may include a respective mean, a respective shape, a respective weight, or any combination thereof associated with the probability distribution. If the mixture distribution is an inverse Weibull type, the distribution parameters for a probability distribution may include a respective shape, a respective scale, a respective weight, or any combination thereof associated with the probability distribution.

At 525, the network entity 105-b may transmit one or more wireless communications to the UE 115-b based on the interference report and the mixture distribution. In some aspects, the network entity 105-b may schedule the wireless communications based on the mixture distribution, the network entity 105-b may design a type or density of one or more reference signals based on the mixture distribution, or both.

Figure 6:
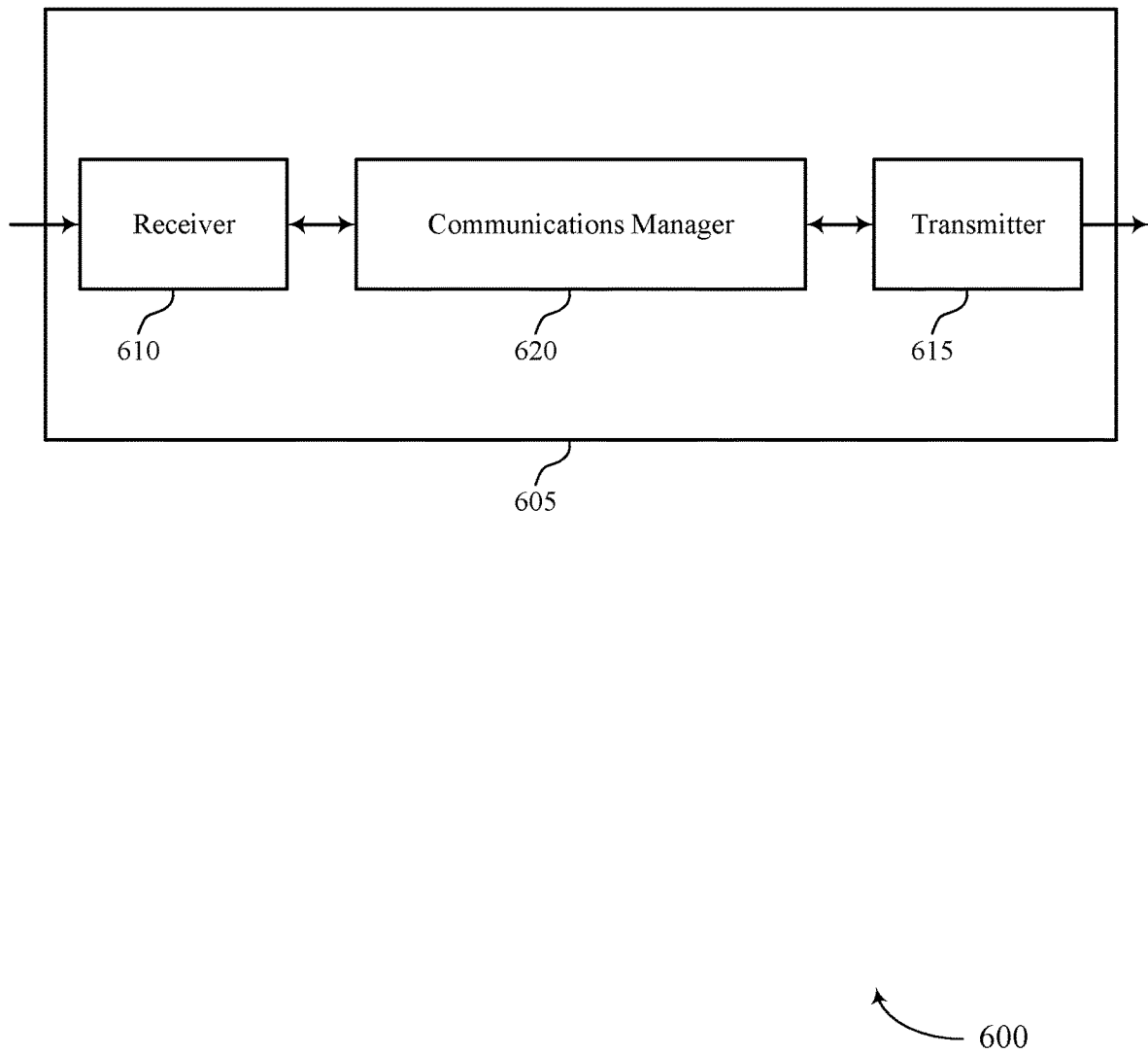
FIGS. 6 and 7 show block diagrams of devices that support interference reporting based on mixture distributions in accordance with one or more aspects of the present disclosure.

FIG. 6 shows a block diagram 600 of a device 605 that supports interference reporting based on mixture distributions in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to interference reporting based on mixture distributions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to interference reporting based on mixture distributions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of interference reporting based on mixture distributions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for obtaining a set of multiple interference measurements for a wireless communication channel. The communications manager 620 may be configured as or otherwise support a means for transmitting an interference report that indicates a respective set of one or more distribution parameters for each probability distribution of a set of multiple probability distributions, where the set of multiple probability distributions are components of a mixture distribution that is representative of interference at the UE, and where the respective sets of one or more distribution parameters are based on the set of multiple interference measurements. The communications manager 620 may be configured as or otherwise support a means for receiving one or more wireless communications based on the interference report and the mixture distribution.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, more efficient utilization of communication resources.

Figure 7:
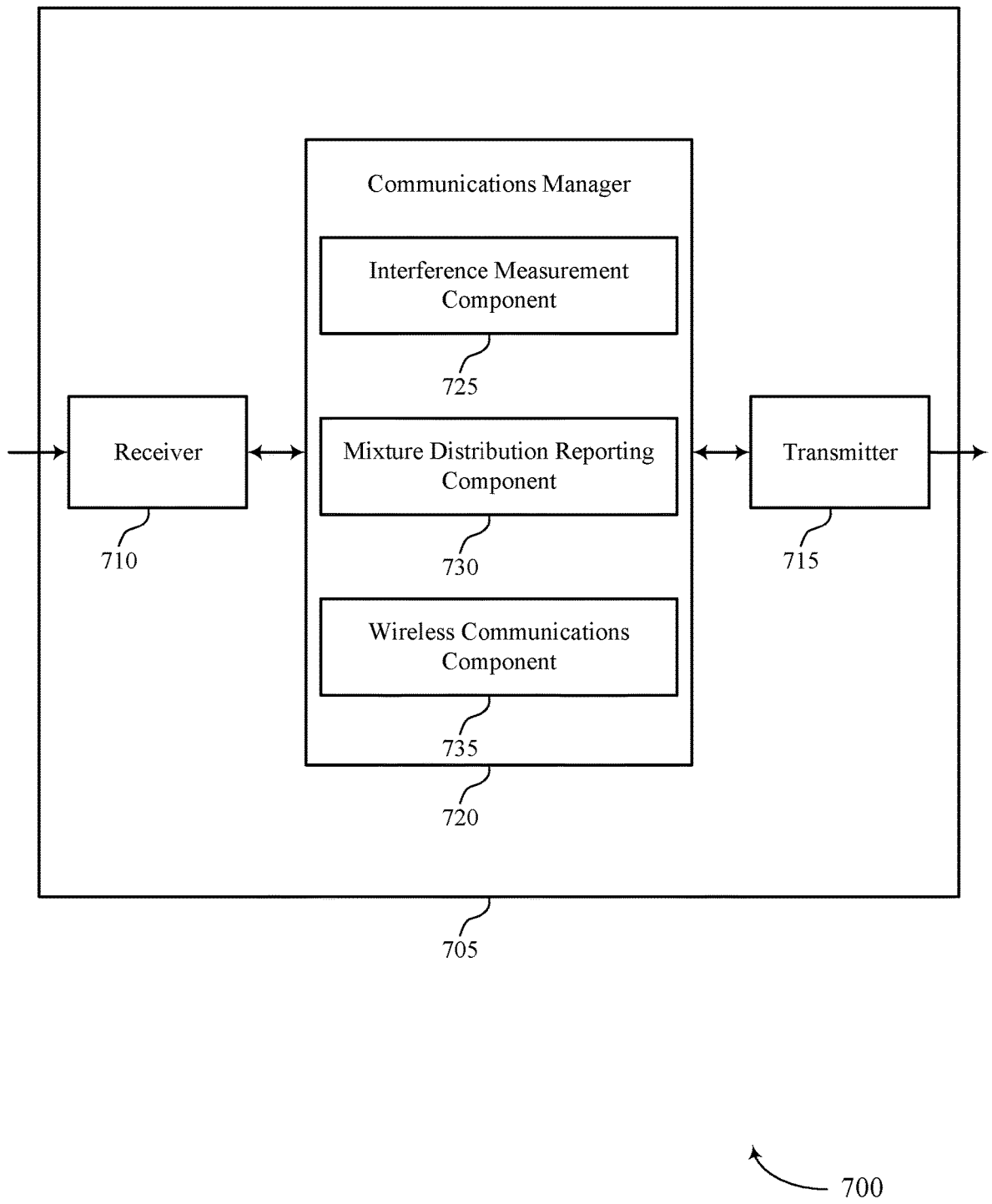

FIG. 7 shows a block diagram 700 of a device 705 that supports interference reporting based on mixture distributions in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to interference reporting based on mixture distributions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to interference reporting based on mixture distributions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of interference reporting based on mixture distributions as described herein. For example, the communications manager 720 may include an interference measurement component 725, a mixture distribution reporting component 730, a wireless communications component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The interference measurement component 725 may be configured as or otherwise support a means for obtaining a set of multiple interference measurements for a wireless communication channel. The mixture distribution reporting component 730 may be configured as or otherwise support a means for transmitting an interference report that indicates a respective set of one or more distribution parameters for each probability distribution of a set of multiple probability distributions, where the set of multiple probability distributions are components of a mixture distribution that is representative of interference at the UE, and where the respective sets of one or more distribution parameters are based on the set of multiple interference measurements. The wireless communications component 735 may be configured as or otherwise support a means for receiving one or more wireless communications based on the interference report and the mixture distribution.

Figure 8:
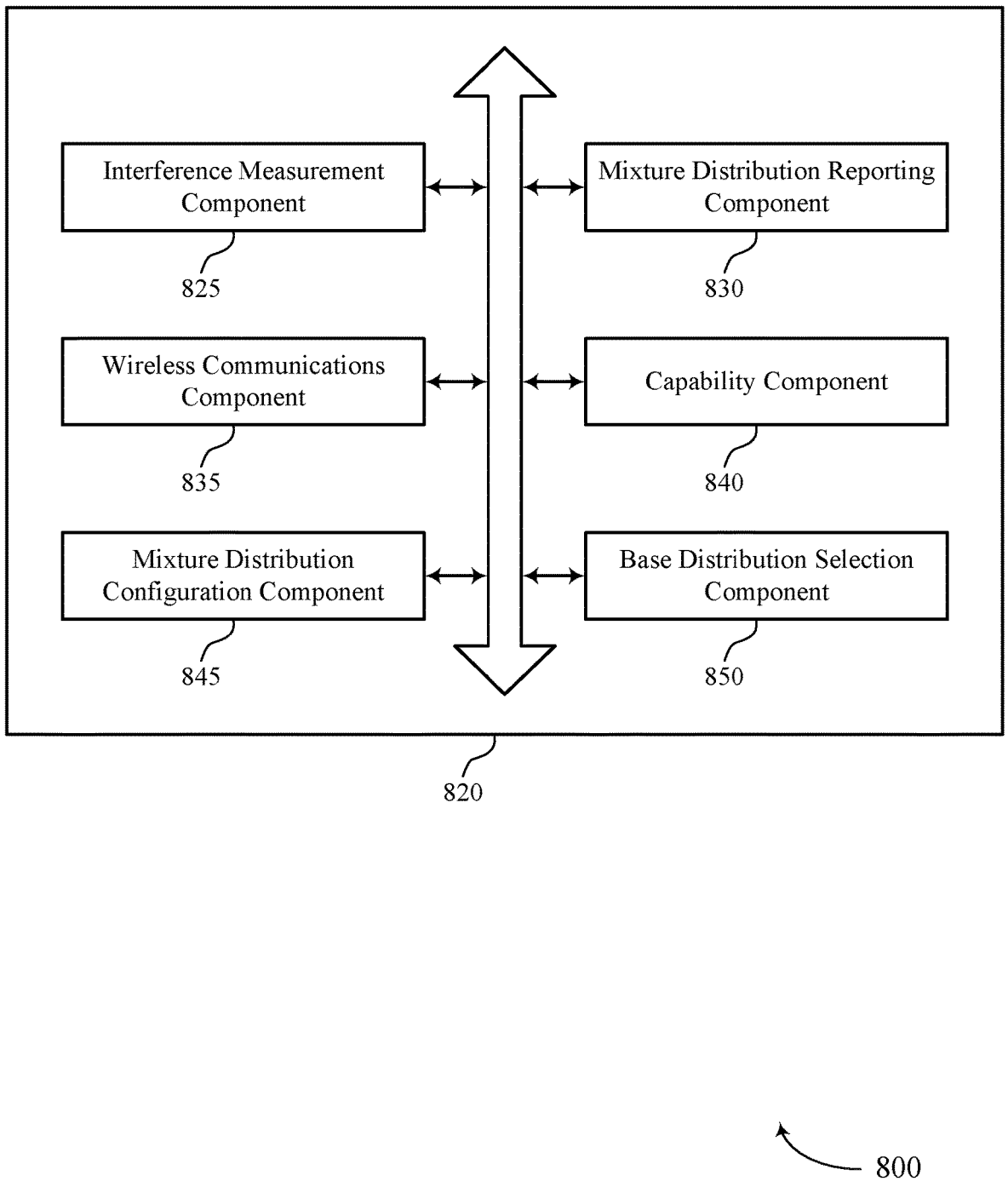
FIG. 8 shows a block diagram of a communications manager that supports interference reporting based on mixture distributions in accordance with one or more aspects of the present disclosure.

FIG. 8 shows a block diagram 800 of a communications manager 820 that supports interference reporting based on mixture distributions in accordance with one or more aspects of the present disclosure. The communications manager 820 may be an example of aspects of a communications manager 620, a communications manager 720, or both, as described herein. The communications manager 820, or various components thereof, may be an example of means for performing various aspects of interference reporting based on mixture distributions as described herein. For example, the communications manager 820 may include an interference measurement component 825, a mixture distribution reporting component 830, a wireless communications component 835, a capability component 840, a mixture distribution configuration component 845, a base distribution selection component 850, or any combination thereof. Each of these components may communicate, directly or indirectly, with one another (e.g., via one or more buses).

The communications manager 820 may support wireless communication at a UE in accordance with examples as disclosed herein. The interference measurement component 825 may be configured as or otherwise support a means for obtaining a set of multiple interference measurements for a wireless communication channel. The mixture distribution reporting component 830 may be configured as or otherwise support a means for transmitting an interference report that indicates a respective set of one or more distribution parameters for each probability distribution of a set of multiple probability distributions, where the set of multiple probability distributions are components of a mixture distribution that is representative of interference at the UE, and where the respective sets of one or more distribution parameters are based on the set of multiple interference measurements. The wireless communications component 835 may be configured as or otherwise support a means for receiving one or more wireless communications based on the interference report and the mixture distribution.

In some examples, the capability component 840 may be configured as or otherwise support a means for transmitting a capability message that indicates a mixture distribution reporting capability of the UE, where transmitting the interference report that indicates the respective sets of one or more distribution parameters associated with the mixture distribution is based on the mixture distribution reporting capability of the UE.

In some examples, to support transmitting the capability message, the capability component 840 may be configured as or otherwise support a means for transmitting an indication of one or more types of base distributions associated with the mixture distribution reporting capability of the UE, the one or more types of base distributions including a Gaussian distribution, an inverse Gaussian distribution, an inverse Weibull distribution, or any combination thereof, where each of the set of multiple probability distributions may be based on a type of base distribution included in the one or more types of base distributions indicated via the capability message.

In some examples, to support transmitting the capability message, the capability component 840 may be configured as or otherwise support a means for transmitting an indication of a maximum quantity of components within a single mixture distribution associated with the mixture distribution reporting capability of the UE, where a quantity of probability distributions within the set of multiple probability distributions is less than or equal to the maximum quantity of components indicated by the capability message.

In some examples, the mixture distribution configuration component 845 may be configured as or otherwise support a means for receiving a control message including a mixture distribution reporting configuration for the UE, where transmitting the interference report that indicates the respective sets of one or more distribution parameters associated with the mixture distribution may be based on the mixture distribution reporting configuration.

In some examples, the mixture distribution reporting configuration indicates one or more types of base distributions for the mixture distribution, the one or more types of base distributions including a Gaussian distribution, an inverse Gaussian distribution, an inverse Weibull distribution, or any combination thereof. In some examples, each of the set of multiple probability distributions associated with the interference report may be based on a type of base distribution included in the one or more types of base distributions indicated by the mixture distribution reporting configuration.

In some examples, the mixture distribution reporting configuration may indicate a maximum quantity of components within a single mixture distribution. In some examples, a quantity of probability distributions within the set of multiple probability distributions is less than or equal to the maximum quantity of components indicated by the mixture distribution reporting configuration.

In some examples, the mixture distribution reporting configuration may indicate a minimum weight for a component of the mixture distribution, and to support transmitting the interference report, the mixture distribution reporting component 830 may be configured as or otherwise support a means for transmitting, within each respective set of one or more distribution parameters in the interference report, a respective weight for a corresponding probability distribution of the set of multiple probability distributions, where the respective weight for each probability distribution of the set of multiple probability distributions may be greater than or equal to the minimum weight indicated by the mixture distribution reporting configuration.

In some examples, the base distribution selection component 850 may be configured as or otherwise support a means for transmitting a message including a switching indication associated with a switch from a first type of base distribution to a second type of base distribution. In some examples, the mixture distribution reporting component 830 may be configured as or otherwise support a means for transmitting a second interference report that indicates a respective second set of one or more second distribution parameters for each second probability distribution of a set of multiple second probability distributions associated with a second mixture distribution, where each of the set of multiple second probability distributions associated with the second interference report may be based on the second type of base distribution indicated by the switching indication.

In some examples, a type of a base distribution for the mixture distribution is a Gaussian type, and the respective set of one or more distribution parameters for each probability distribution of the set of multiple probability distributions may include a respective mean, a respective covariance matrix, a respective weight, or any combination thereof associated with the probability distribution. In some examples, the respective covariance matrix may indicate an interference correlation across one or more dimensions, the one or more dimensions associated with antenna ports, antenna elements, time, frequency, or any combination thereof.

In some examples, a type of a base distribution for the mixture distribution is an inverse Gaussian type, and the respective set of one or more distribution parameters for each probability distribution of the set of multiple probability distributions may include a respective mean, a respective shape, a respective weight, or any combination thereof associated with the probability distribution. In some examples, a type of a base distribution for the mixture distribution is an inverse Weibull type, and the respective set of one or more distribution parameters for each probability distribution of the set of multiple probability distributions may include a respective shape, a respective scale, a respective weight, or any combination thereof associated with the probability distribution.

Figure 9:
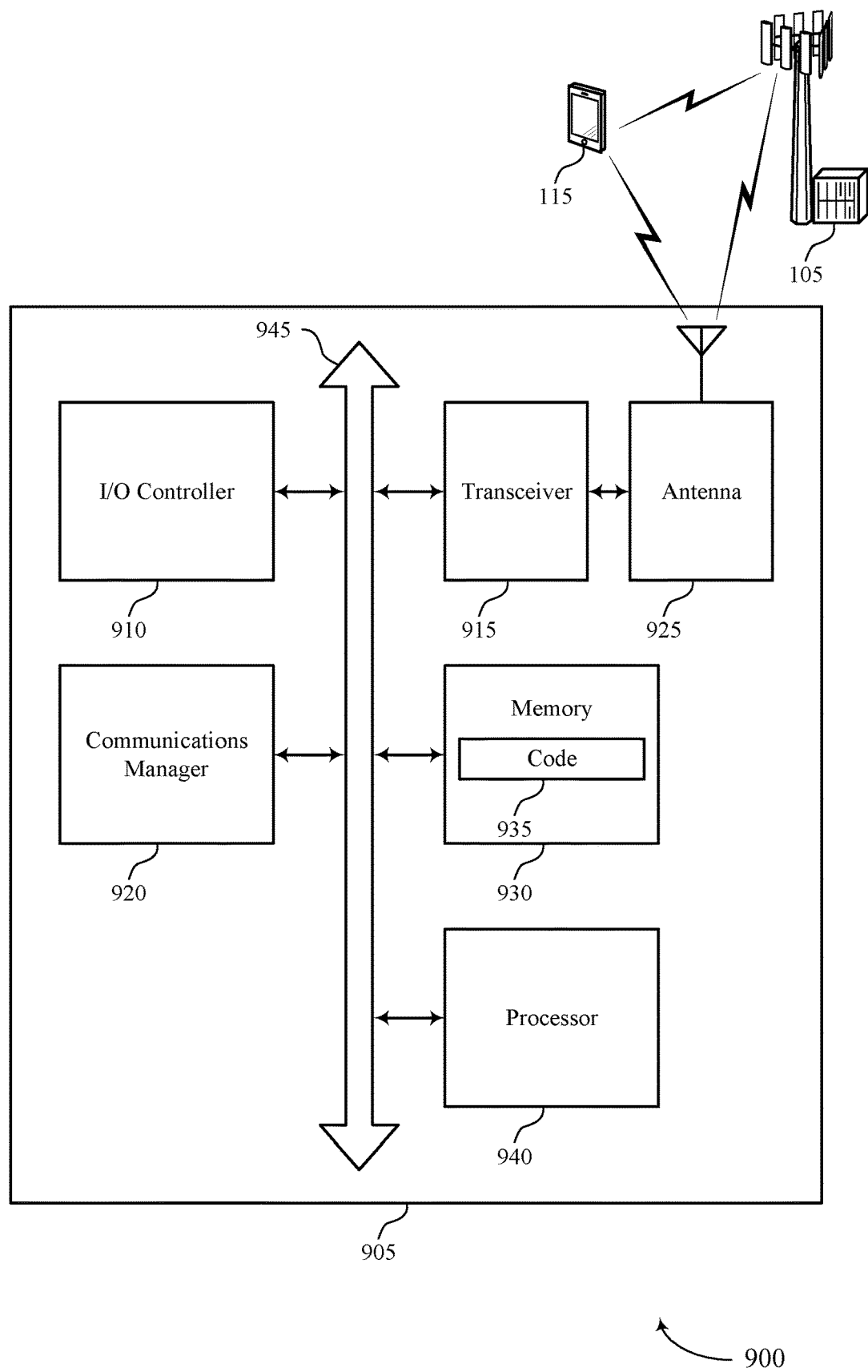
FIG. 9 shows a diagram of a system including a device that supports interference reporting based on mixture distributions in accordance with one or more aspects of the present disclosure.

FIG. 9 shows a diagram of a system 900 including a device 905 that supports interference reporting based on mixture distributions in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting interference reporting based on mixture distributions). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for obtaining a set of multiple interference measurements for a wireless communication channel. The communications manager 920 may be configured as or otherwise support a means for transmitting an interference report that indicates a respective set of one or more distribution parameters for each probability distribution of a set of multiple probability distributions, where the set of multiple probability distributions are components of a mixture distribution that is representative of interference at the UE, and where the respective sets of one or more distribution parameters are based on the set of multiple interference measurements. The communications manager 920 may be configured as or otherwise support a means for receiving one or more wireless communications based on the interference report and the mixture distribution.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of interference reporting based on mixture distributions as described herein, or the processor 940 and the memory 930 may be otherwise configured to perform or support such operations.

Figure 10:
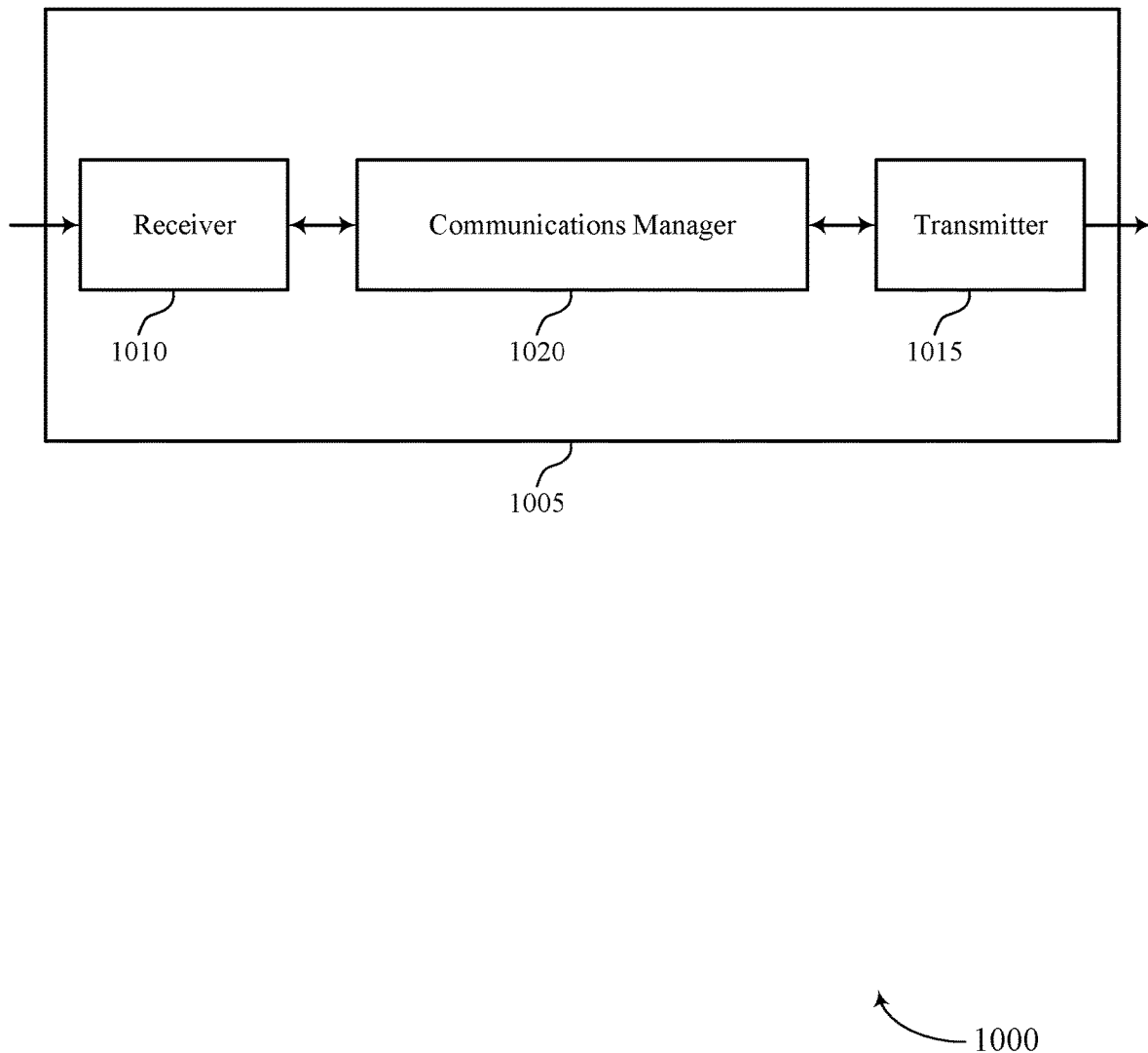
FIGS. 10 and 11 show block diagrams of devices that support interference reporting based on mixture distributions in accordance with one or more aspects of the present disclosure.

FIG. 10 shows a block diagram 1000 of a device 1005 that supports interference reporting based on mixture distributions in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of interference reporting based on mixture distributions as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting a set of multiple signals via a set of multiple interference measurement resources for a wireless communication channel. The communications manager 1020 may be configured as or otherwise support a means for receiving an interference report that indicates a respective set of one or more distribution parameters for each probability distribution of a set of multiple probability distributions, where the set of multiple probability distributions are components of a mixture distribution that is representative of interference at a UE, and where the respective sets of one or more distribution parameters are based on a set of multiple interference measurements of the set of multiple interference measurement resources. The communications manager 1020 may be configured as or otherwise support a means for transmitting one or more wireless communications based on the interference report and the mixture distribution.

Figure 11:
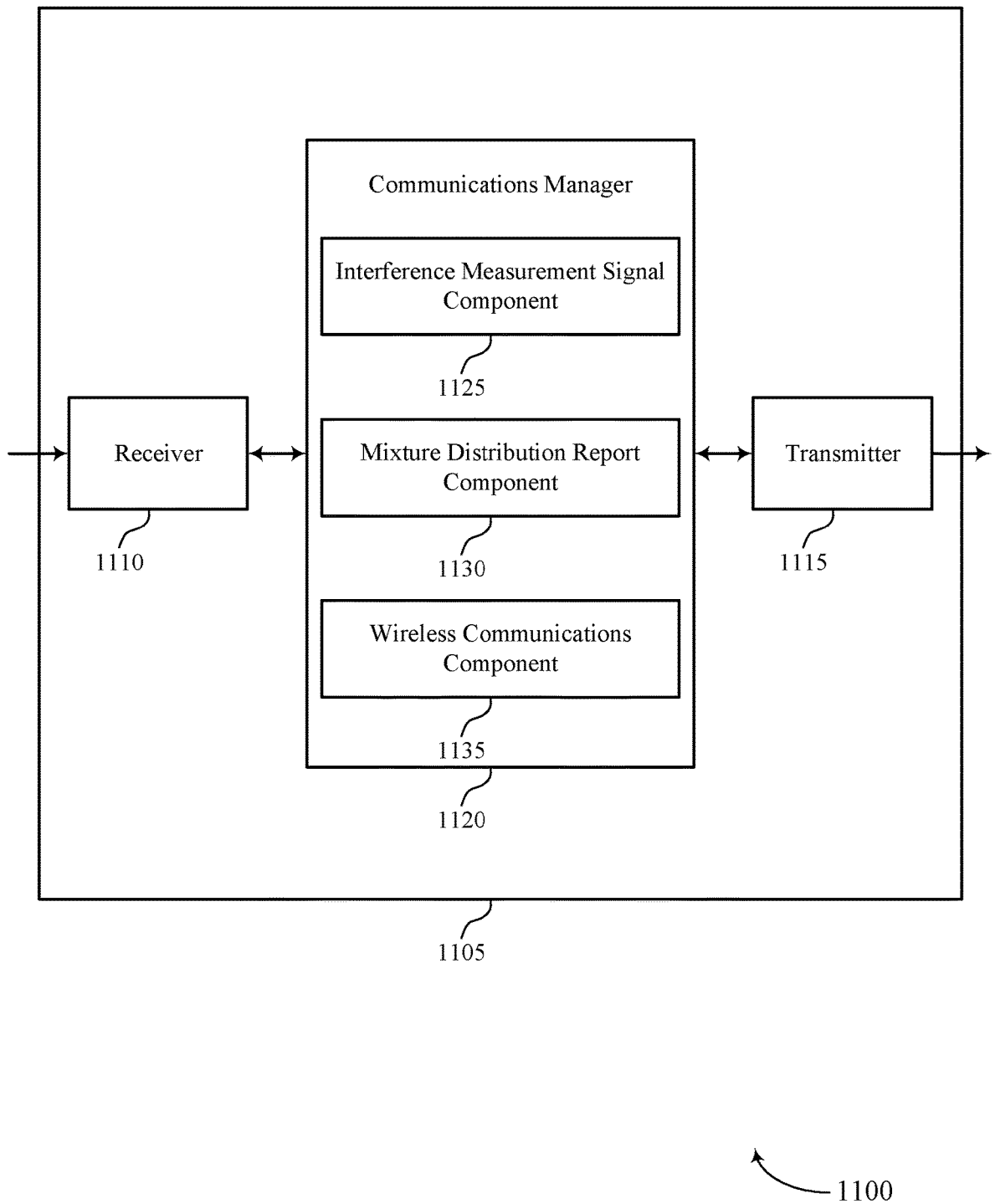

FIG. 11 shows a block diagram 1100 of a device 1105 that supports interference reporting based on mixture distributions in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of interference reporting based on mixture distributions as described herein. For example, the communications manager 1120 may include an interference measurement signal component 1125, a mixture distribution report component 1130, a wireless communications component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The interference measurement signal component 1125 may be configured as or otherwise support a means for transmitting a set of multiple signals via a set of multiple interference measurement resources for a wireless communication channel. The mixture distribution report component 1130 may be configured as or otherwise support a means for receiving an interference report that indicates a respective set of one or more distribution parameters for each probability distribution of a set of multiple probability distributions, where the set of multiple probability distributions are components of a mixture distribution that is representative of interference at a UE, and where the respective sets of one or more distribution parameters are based on a set of multiple interference measurements of the set of multiple interference measurement resources. The wireless communications component 1135 may be configured as or otherwise support a means for transmitting one or more wireless communications based on the interference report and the mixture distribution.

Figure 12:
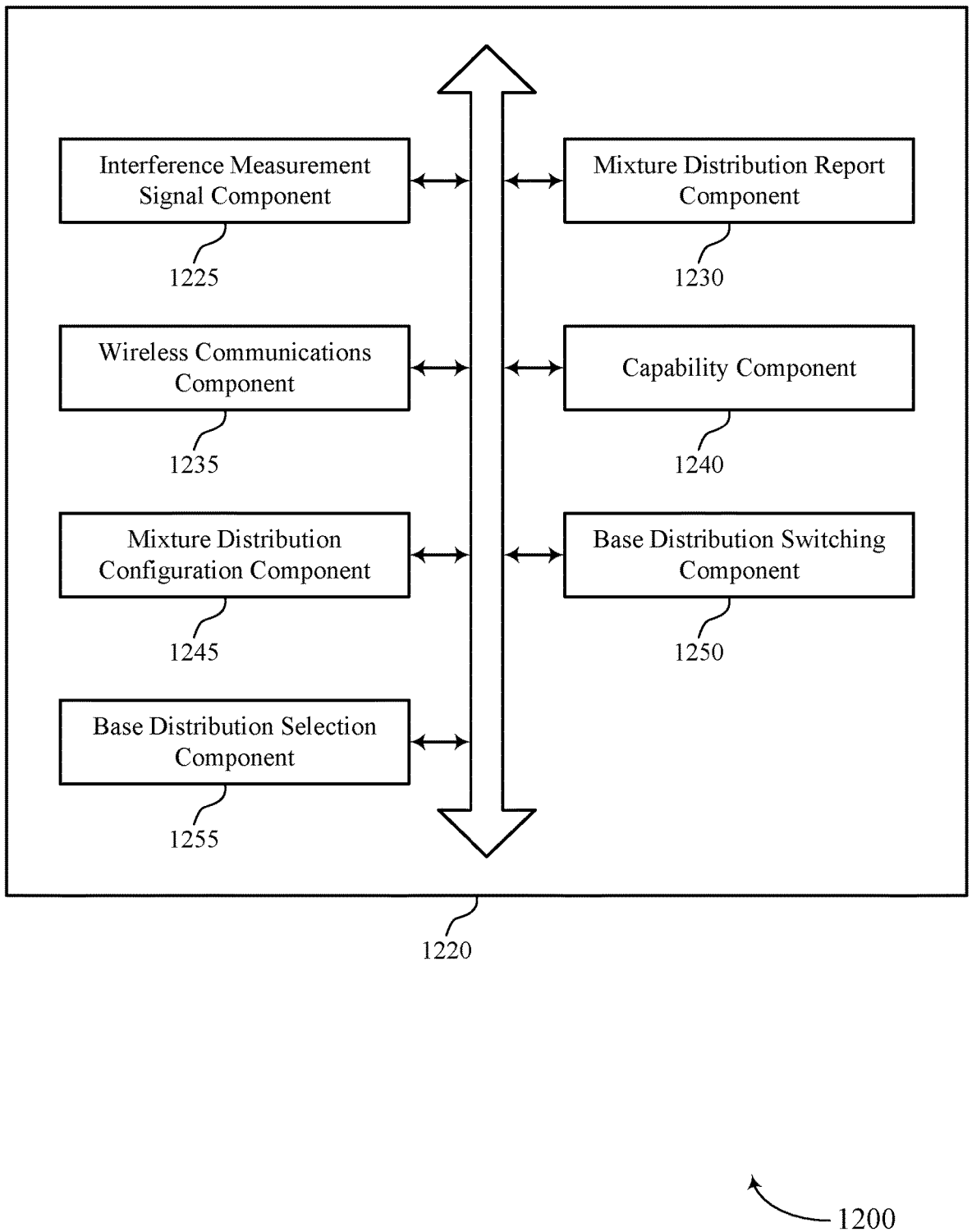
FIG. 12 shows a block diagram of a communications manager that supports interference reporting based on mixture distributions in accordance with one or more aspects of the present disclosure.

FIG. 12 shows a block diagram 1200 of a communications manager 1220 that supports interference reporting based on mixture distributions in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of interference reporting based on mixture distributions as described herein. For example, the communications manager 1220 may include an interference measurement signal component 1225, a mixture distribution report component 1230, a wireless communications component 1235, a capability component 1240, a mixture distribution configuration component 1245, a base distribution switching component 1250, a base distribution selection component 1255, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The interference measurement signal component 1225 may be configured as or otherwise support a means for transmitting a set of multiple signals via a set of multiple interference measurement resources for a wireless communication channel. The mixture distribution report component 1230 may be configured as or otherwise support a means for receiving an interference report that indicates a respective set of one or more distribution parameters for each probability distribution of a set of multiple probability distributions, where the set of multiple probability distributions are components of a mixture distribution that is representative of interference at a UE, and where the respective sets of one or more distribution parameters are based on a set of multiple interference measurements of the set of multiple interference measurement resources. The wireless communications component 1235 may be configured as or otherwise support a means for transmitting one or more wireless communications based on the interference report and the mixture distribution.

In some examples, the capability component 1240 may be configured as or otherwise support a means for receiving a capability message that indicates a mixture distribution reporting capability of the UE, where the respective sets of one or more distribution parameters associated with the mixture distribution may be based on the mixture distribution reporting capability of the UE.

In some examples, to support receiving the capability message, the capability component 1240 may be configured as or otherwise support a means for receiving an indication of one or more types of base distributions associated with the mixture distribution reporting capability of the UE, the one or more types of base distributions including a Gaussian distribution, an inverse Gaussian distribution, an inverse Weibull distribution, or any combination thereof, where each of the set of multiple probability distributions may be based on a type of base distribution included in the one or more types of base distributions indicated via the capability message.

In some examples, to support receiving the capability message, the capability component 1240 may be configured as or otherwise support a means for receiving an indication of a maximum quantity of components within a single mixture distribution associated with the mixture distribution reporting capability of the UE, where a quantity of probability distributions within the set of multiple probability distributions may be less than or equal to the maximum quantity of components indicated by the capability message.

In some examples, the mixture distribution configuration component 1245 may be configured as or otherwise support a means for transmitting a control message including a mixture distribution reporting configuration for the UE, where the respective sets of one or more distribution parameters associated with the mixture distribution may be based on the mixture distribution reporting configuration. In some examples, the mixture distribution configuration component 1245 may be configured as or otherwise support a means for determining the mixture distribution reporting configuration based on a location of the UE within a cell, an interference pattern associated with the UE, a bandwidth available for interference reporting, or any combination thereof.

In some examples, the mixture distribution reporting configuration may indicate one or more types of base distributions for the mixture distribution, the one or more types of base distributions including a Gaussian distribution, an inverse Gaussian distribution, an inverse Weibull distribution, or any combination thereof. In some examples, each of the set of multiple probability distributions associated with the interference report may be based on a type of base distribution included in the one or more types of base distributions indicated by the mixture distribution reporting configuration.

In some examples, the mixture distribution reporting configuration may indicate a maximum quantity of components within a single mixture distribution. In some examples, a quantity of probability distributions within the set of multiple probability distributions may be less than or equal to the maximum quantity of components indicated by the mixture distribution reporting configuration.

In some examples, the mixture distribution reporting configuration may indicate a minimum weight for a component of the mixture distribution, and to support receiving the interference report, the mixture distribution report component 1230 may be configured as or otherwise support a means for receiving, within each respective set of one or more distribution parameters in the interference report, a respective weight for a corresponding probability distribution of the set of multiple probability distributions, where the respective weight for each probability distribution of the set of multiple probability distributions is greater than or equal to the minimum weight indicated by the mixture distribution reporting configuration.

In some examples, the base distribution switching component 1250 may be configured as or otherwise support a means for receiving a message including a switching indication associated with a switch from a first type of base distribution to a second type of base distribution. In some examples, the mixture distribution report component 1230 may be configured as or otherwise support a means for receiving a second interference report that indicates a respective second set of one or more second distribution parameters for each second probability distribution of a set of multiple second probability distributions associated with a second mixture distribution, where each of the set of multiple second probability distributions associated with the second interference report is based on the second type of base distribution indicated by the switching indication.

In some examples, a type of a base distribution for the mixture distribution is a Gaussian type, and the respective set of one or more distribution parameters for each probability distribution of the set of multiple probability distributions may include a respective mean, a respective covariance matrix, a respective weight, or any combination thereof associated with the probability distribution. In some examples, a type of a base distribution for the mixture distribution is an inverse Gaussian type or an inverse Weibull type, and the respective set of one or more distribution parameters for each probability distribution of the set of multiple probability distributions may include a respective mean, a respective shape, a respective scale, a respective weight, or any combination thereof associated with the probability distribution.

Figure 13:
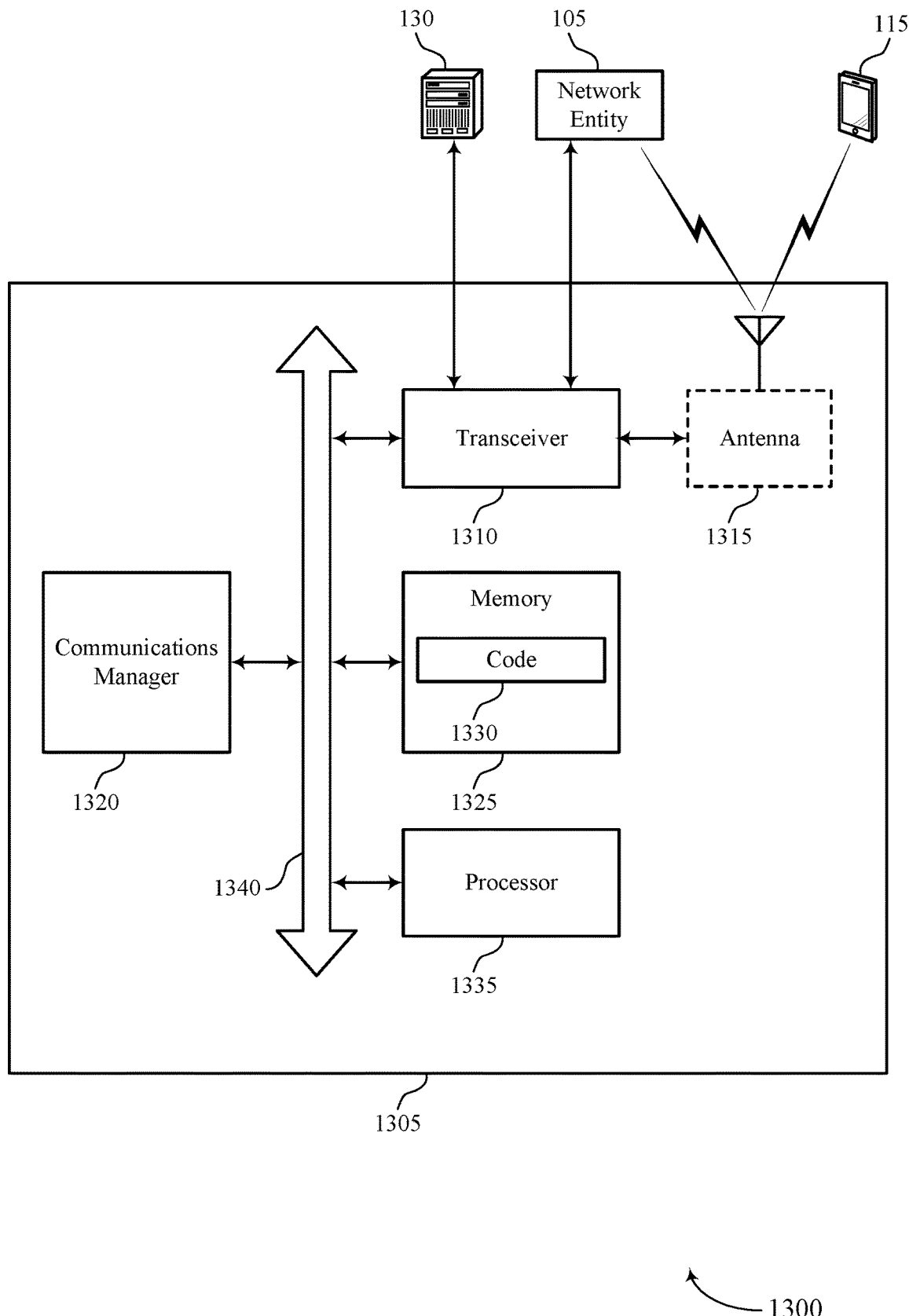
FIG. 13 shows a diagram of a system including a device that supports interference reporting based on mixture distributions in accordance with one or more aspects of the present disclosure.

FIG. 13 shows a diagram of a system 1300 including a device 1305 that supports interference reporting based on mixture distributions in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting interference reporting based on mixture distributions). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting a set of multiple signals via a set of multiple interference measurement resources for a wireless communication channel. The communications manager 1320 may be configured as or otherwise support a means for receiving an interference report that indicates a respective set of one or more distribution parameters for each probability distribution of a set of multiple probability distributions, where the set of multiple probability distributions are components of a mixture distribution that is representative of interference at a UE, and where the respective sets of one or more distribution parameters are based on a set of multiple interference measurements of the set of multiple interference measurement resources. The communications manager 1320 may be configured as or otherwise support a means for transmitting one or more wireless communications based on the interference report and the mixture distribution.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of interference reporting based on mixture distributions as described herein, or the processor 1335 and the memory 1325 may be otherwise configured to perform or support such operations.

Figure 14:
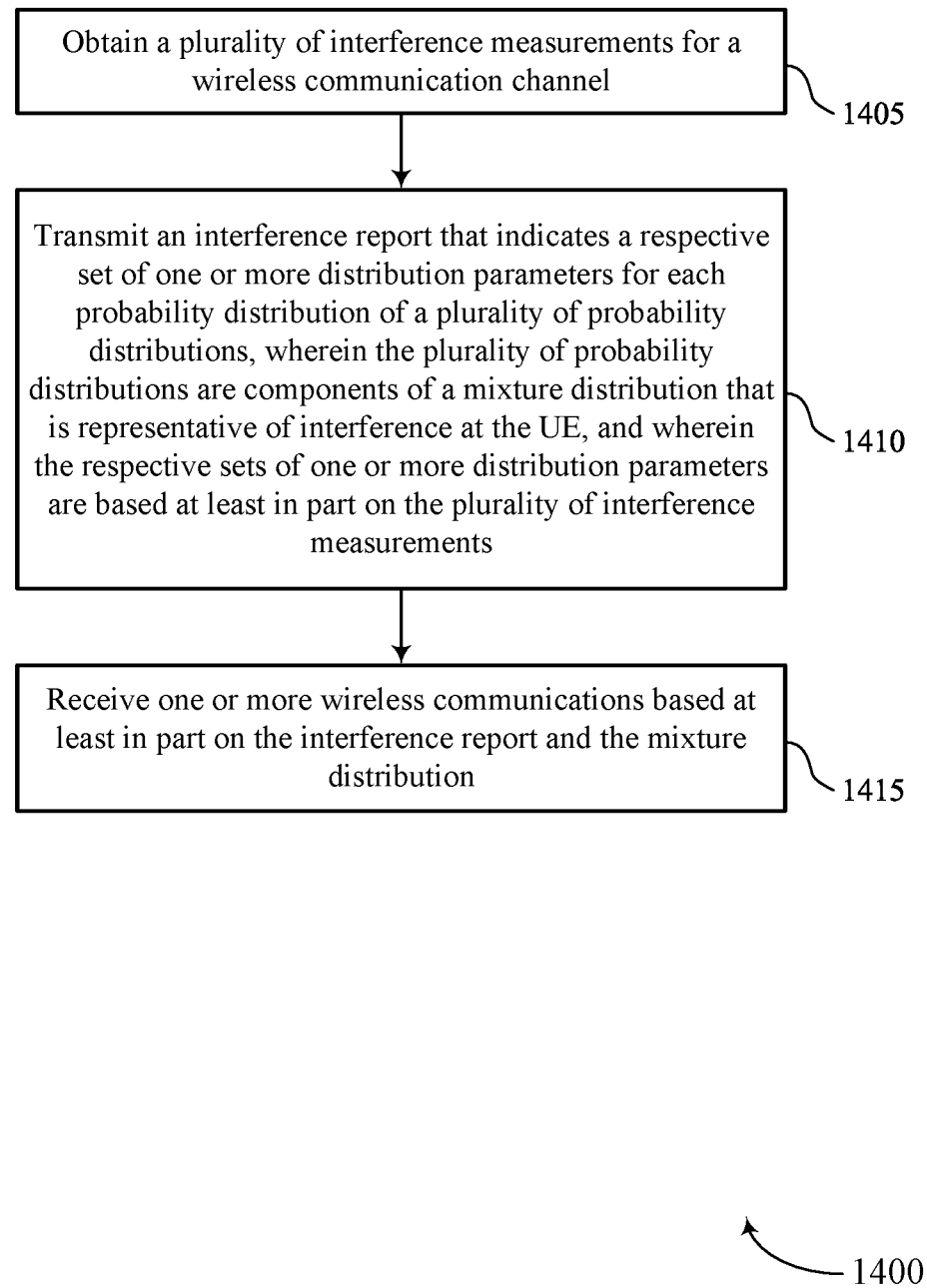
FIGS. 14 through 18 show flowcharts illustrating methods that support interference reporting based on mixture distributions in accordance with one or more aspects of the present disclosure.

FIG. 14 shows a flowchart illustrating a method 1400 that supports interference reporting based on mixture distributions in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include obtaining a set of multiple interference measurements for a wireless communication channel. The operations of 1405 may be performed in accordance with examples as disclosed herein. In some examples, aspects of the operations of 1405 may be performed by an interference measurement component 825 as described with reference to FIG. 8.

At 1410, the method may include transmitting an interference report that indicates a respective set of one or more distribution parameters for each probability distribution of a set of multiple probability distributions, where the set of multiple probability distributions are components of a mixture distribution that is representative of interference at the UE, and where the respective sets of one or more distribution parameters are based on the set of multiple interference measurements. The operations of 1410 may be performed in accordance with examples as disclosed herein. In some examples, aspects of the operations of 1410 may be performed by a mixture distribution reporting component 830 as described with reference to FIG. 8.

At 1415, the method may include receiving one or more wireless communications based on the interference report and the mixture distribution. The operations of 1415 may be performed in accordance with examples as disclosed herein. In some examples, aspects of the operations of 1415 may be performed by a wireless communications component 835 as described with reference to FIG. 8.

Figure 15:
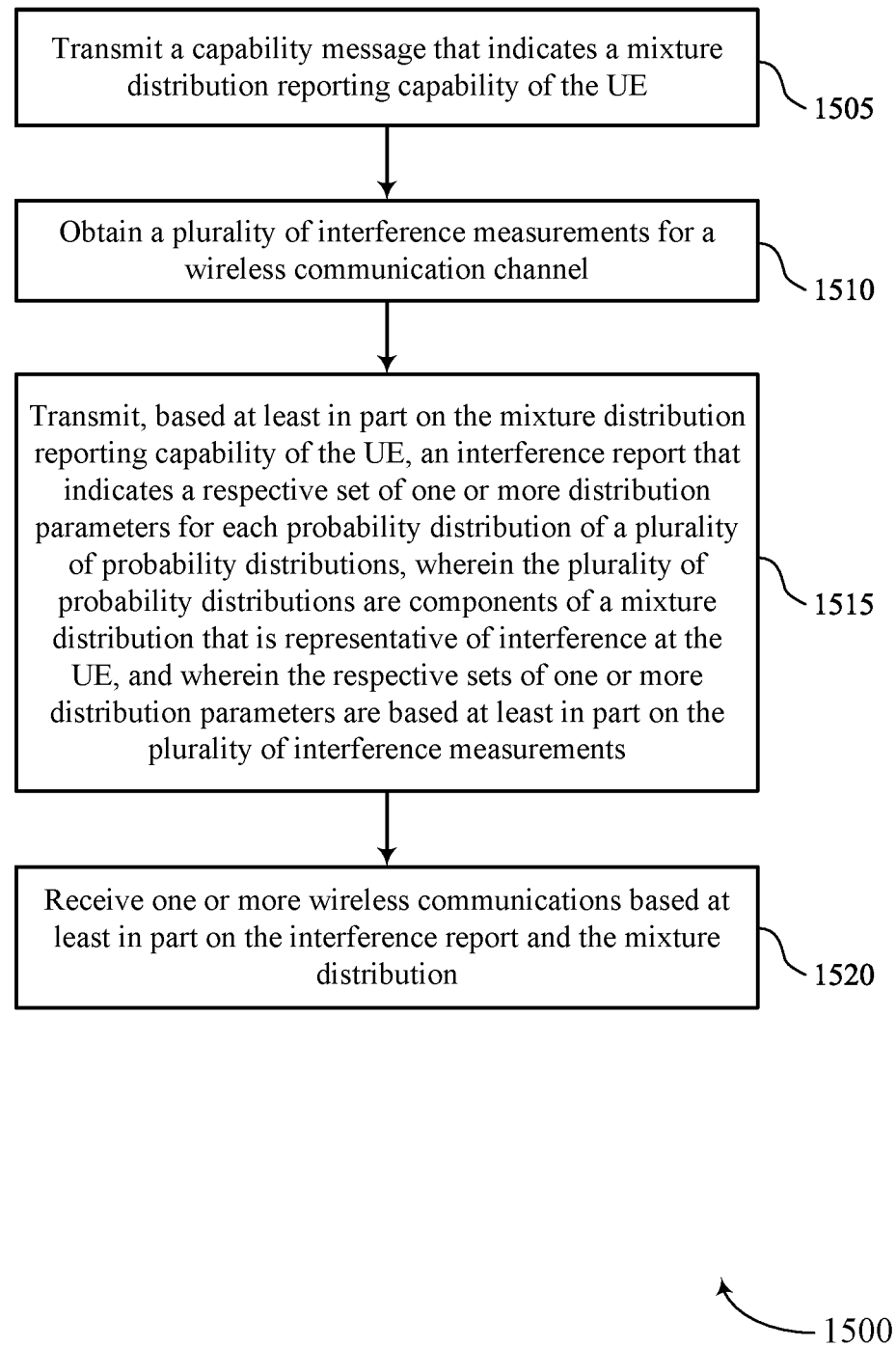

FIG. 15 shows a flowchart illustrating a method 1500 that supports interference reporting based on mixture distributions in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting a capability message that indicates a mixture distribution reporting capability of the UE. The operations of 1505 may be performed in accordance with examples as disclosed herein. In some examples, aspects of the operations of 1505 may be performed by a capability component 840 as described with reference to FIG. 8.

At 1510, the method may include obtaining a set of multiple interference measurements for a wireless communication channel. The operations of 1510 may be performed in accordance with examples as disclosed herein. In some examples, aspects of the operations of 1510 may be performed by an interference measurement component 825 as described with reference to FIG. 8.

At 1515, the method may include transmitting, based on the mixture distribution reporting capability of the UE, an interference report that indicates a respective set of one or more distribution parameters for each probability distribution of a set of multiple probability distributions, where the set of multiple probability distributions are components of a mixture distribution that is representative of interference at the UE, and where the respective sets of one or more distribution parameters are based on the set of multiple interference measurements. The operations of 1515 may be performed in accordance with examples as disclosed herein. In some examples, aspects of the operations of 1515 may be performed by a mixture distribution reporting component 830 as described with reference to FIG. 8.

At 1520, the method may include receiving one or more wireless communications based on the interference report and the mixture distribution. The operations of 1520 may be performed in accordance with examples as disclosed herein. In some examples, aspects of the operations of 1520 may be performed by a wireless communications component 835 as described with reference to FIG. 8.

Figure 16:
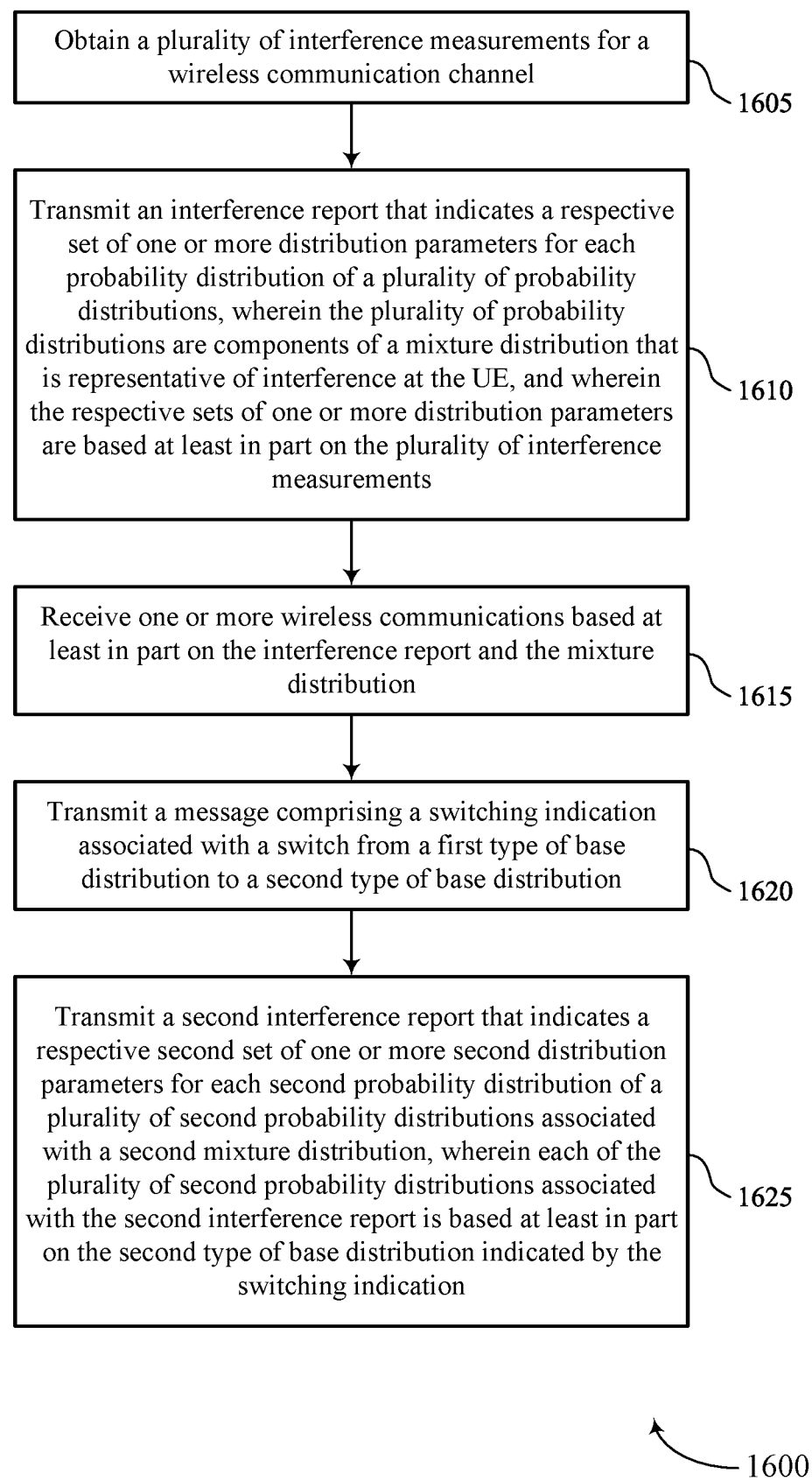

FIG. 16 shows a flowchart illustrating a method 1600 that supports interference reporting based on mixture distributions in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include obtaining a set of multiple interference measurements for a wireless communication channel. The operations of 1605 may be performed in accordance with examples as disclosed herein. In some examples, aspects of the operations of 1605 may be performed by an interference measurement component 825 as described with reference to FIG. 8.

At 1610, the method may include transmitting an interference report that indicates a respective set of one or more distribution parameters for each probability distribution of a set of multiple probability distributions, where the set of multiple probability distributions are components of a mixture distribution that is representative of interference at the UE, and where the respective sets of one or more distribution parameters are based on the set of multiple interference measurements. The operations of 1610 may be performed in accordance with examples as disclosed herein. In some examples, aspects of the operations of 1610 may be performed by a mixture distribution reporting component 830 as described with reference to FIG. 8.

At 1615, the method may include receiving one or more wireless communications based on the interference report and the mixture distribution. The operations of 1615 may be performed in accordance with examples as disclosed herein. In some examples, aspects of the operations of 1615 may be performed by a wireless communications component 835 as described with reference to FIG. 8.

At 1620, the method may include transmitting a message including a switching indication associated with a switch from a first type of base distribution to a second type of base distribution. The operations of 1620 may be performed in accordance with examples as disclosed herein. In some examples, aspects of the operations of 1620 may be performed by a base distribution selection component 850 as described with reference to FIG. 8.

At 1625, the method may include transmitting a second interference report that indicates a respective second set of one or more second distribution parameters for each second probability distribution of a set of multiple second probability distributions associated with a second mixture distribution, where each of the set of multiple second probability distributions associated with the second interference report is based on the second type of base distribution indicated by the switching indication. The operations of 1625 may be performed in accordance with examples as disclosed herein. In some examples, aspects of the operations of 1625 may be performed by a mixture distribution reporting component 830 as described with reference to FIG. 8.

Figure 17:
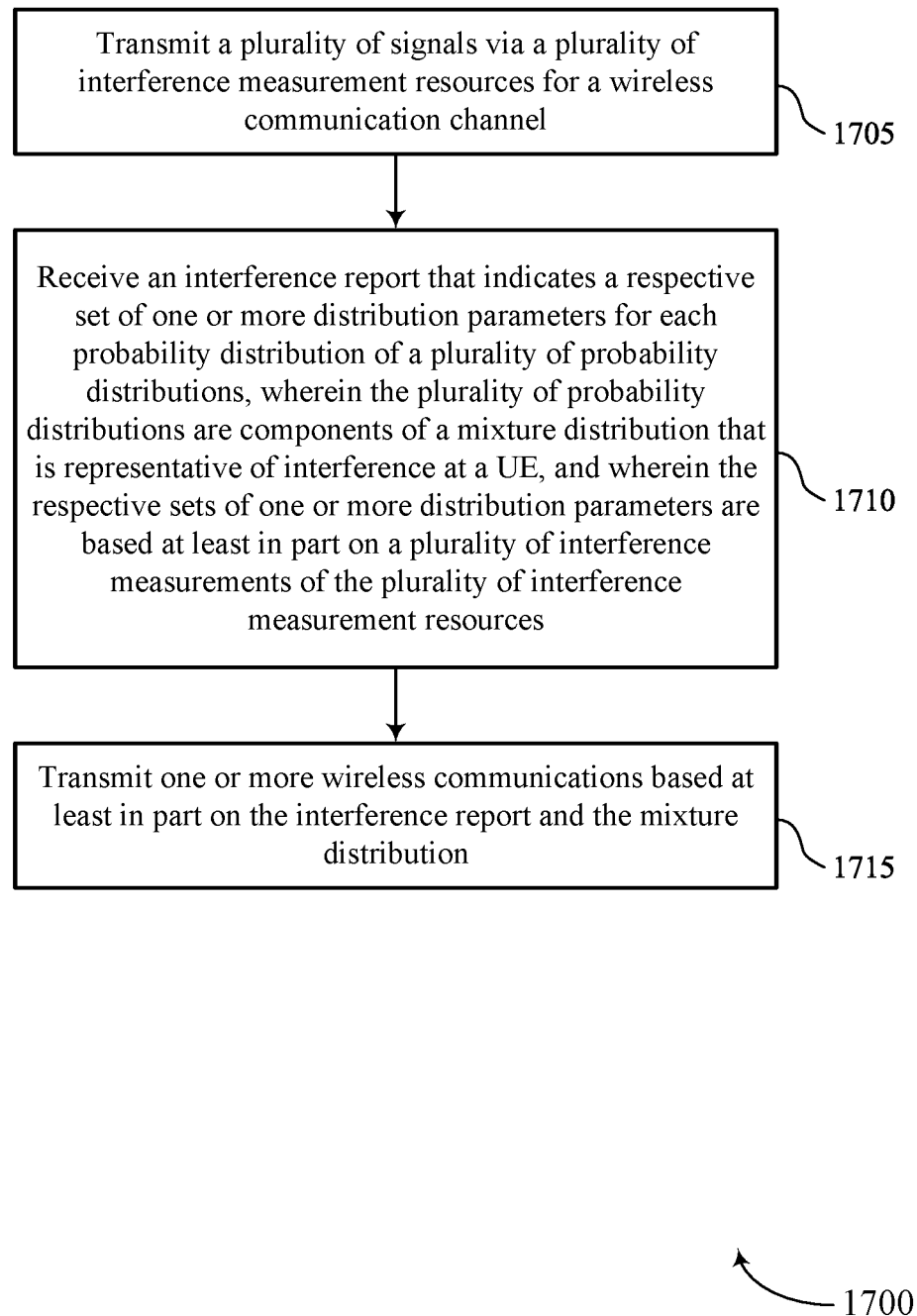

FIG. 17 shows a flowchart illustrating a method 1700 that supports interference reporting based on mixture distributions in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a set of multiple signals via a set of multiple interference measurement resources for a wireless communication channel. The operations of 1705 may be performed in accordance with examples as disclosed herein. In some examples, aspects of the operations of 1705 may be performed by an interference measurement signal component 1225 as described with reference to FIG. 12.

At 1710, the method may include receiving an interference report that indicates a respective set of one or more distribution parameters for each probability distribution of a set of multiple probability distributions, where the set of multiple probability distributions are components of a mixture distribution that is representative of interference at a UE, and where the respective sets of one or more distribution parameters are based on a set of multiple interference measurements of the set of multiple interference measurement resources. The operations of 1710 may be performed in accordance with examples as disclosed herein. In some examples, aspects of the operations of 1710 may be performed by a mixture distribution report component 1230 as described with reference to FIG. 12.

At 1715, the method may include transmitting one or more wireless communications based on the interference report and the mixture distribution. The operations of 1715 may be performed in accordance with examples as disclosed herein. In some examples, aspects of the operations of 1715 may be performed by a wireless communications component 1235 as described with reference to FIG. 12.

Figure 18:
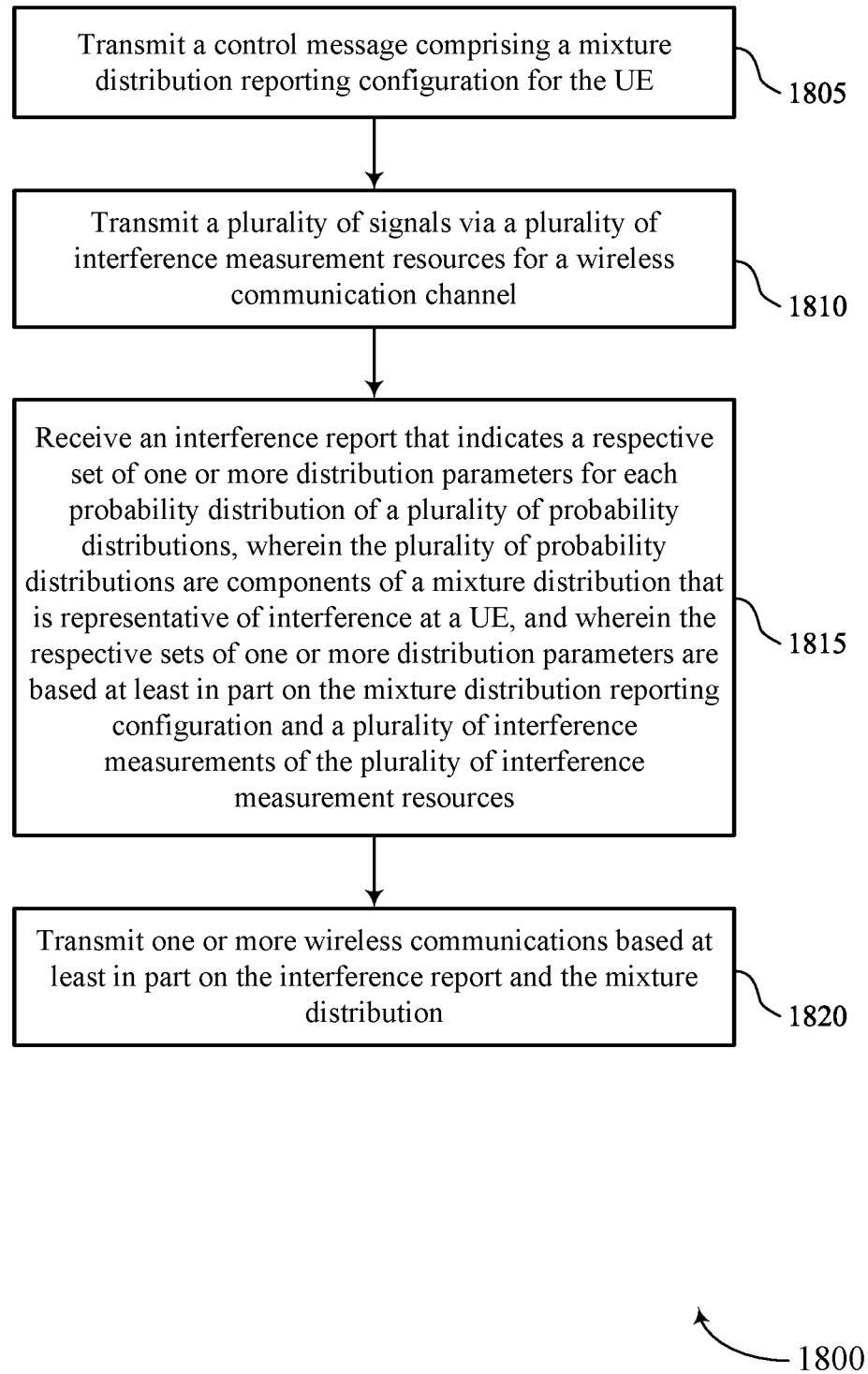

FIG. 18 shows a flowchart illustrating a method 1800 that supports interference reporting based on mixture distributions in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a control message including a mixture distribution reporting configuration for the UE. The operations of 1805 may be performed in accordance with examples as disclosed herein. In some examples, aspects of the operations of 1805 may be performed by a mixture distribution configuration component 1245 as described with reference to FIG. 12.

At 1810, the method may include transmitting a set of multiple signals via a set of multiple interference measurement resources for a wireless communication channel. The operations of 1810 may be performed in accordance with examples as disclosed herein. In some examples, aspects of the operations of 1810 may be performed by an interference measurement signal component 1225 as described with reference to FIG. 12.

At 1815, the method may include receiving an interference report that indicates a respective set of one or more distribution parameters for each probability distribution of a set of multiple probability distributions, where the set of multiple probability distributions are components of a mixture distribution that is representative of interference at a UE, and where the respective sets of one or more distribution parameters are based on the mixture distribution reporting configuration and on a set of multiple interference measurements of the set of multiple interference measurement resources. The operations of 1815 may be performed in accordance with examples as disclosed herein. In some examples, aspects of the operations of 1815 may be performed by a mixture distribution report component 1230 as described with reference to FIG. 12.

At 1820, the method may include transmitting one or more wireless communications based on the interference report and the mixture distribution. The operations of 1820 may be performed in accordance with examples as disclosed herein. In some examples, aspects of the operations of 1820 may be performed by a wireless communications component 1235 as described with reference to FIG. 12.

The following provides an overview of aspects of the present disclosure:

Aspect 1: A method for wireless communication at a UE, comprising: obtaining a plurality of interference measurements for a wireless communication channel; transmitting an interference report that indicates a respective set of one or more distribution parameters for each probability distribution of a plurality of probability distributions, wherein the plurality of probability distributions are components of a mixture distribution that is representative of interference at the UE, and wherein the respective sets of one or more distribution parameters are based at least in part on the plurality of interference measurements; and receiving one or more wireless communications based at least in part on the interference report and the mixture distribution.

Aspect 2: The method of aspect 1, further comprising: transmitting a capability message that indicates a mixture distribution reporting capability of the UE, wherein transmitting the interference report that indicates the respective sets of one or more distribution parameters associated with the mixture distribution is based at least in part on the mixture distribution reporting capability of the UE.

Aspect 3: The method of aspect 2, wherein transmitting the capability message comprises: transmitting an indication of one or more types of base distributions associated with the mixture distribution reporting capability of the UE, the one or more types of base distributions comprising a Gaussian distribution, an inverse Gaussian distribution, an inverse Weibull distribution, or any combination thereof, wherein each of the plurality of probability distributions is based at least in part on a type of base distribution included in the one or more types of base distributions indicated via the capability message.

Aspect 4: The method of any of aspects 2 through 3, wherein transmitting the capability message comprises: transmitting an indication of a maximum quantity of components within a single mixture distribution associated with the mixture distribution reporting capability of the UE, wherein a quantity of probability distributions within the plurality of probability distributions is less than or equal to the maximum quantity of components indicated by the capability message.

Aspect 5: The method of any of aspects 1 through 4, further comprising: receiving a control message comprising a mixture distribution reporting configuration for the UE, wherein transmitting the interference report that indicates the respective sets of one or more distribution parameters associated with the mixture distribution is based at least in part on the mixture distribution reporting configuration.

Aspect 6: The method of aspect 5, wherein: the mixture distribution reporting configuration indicates one or more types of base distributions for the mixture distribution, the one or more types of base distributions comprising a Gaussian distribution, an inverse Gaussian distribution, an inverse Weibull distribution, or any combination thereof; and each of the plurality of probability distributions associated with the interference report is based at least in part on a type of base distribution included in the one or more types of base distributions indicated by the mixture distribution reporting configuration.

Aspect 7: The method of any of aspects 5 through 6, wherein: the mixture distribution reporting configuration indicates a maximum quantity of components within a single mixture distribution; and a quantity of probability distributions within the plurality of probability distributions is less than or equal to the maximum quantity of components indicated by the mixture distribution reporting configuration.

Aspect 8: The method of any of aspects 5 through 7, wherein the mixture distribution reporting configuration indicates a minimum weight for a component of the mixture distribution, and wherein transmitting the interference report comprises: transmitting, within each respective set of one or more distribution parameters in the interference report, a respective weight for a corresponding probability distribution of the plurality of probability distributions, wherein the respective weight for each probability distribution of the plurality of probability distributions is greater than or equal to the minimum weight indicated by the mixture distribution reporting configuration.

Aspect 9: The method of any of aspects 1 through 8, further comprising: transmitting a message comprising a switching indication associated with a switch from a first type of base distribution to a second type of base distribution; and transmitting a second interference report that indicates a respective second set of one or more second distribution parameters for each second probability distribution of a plurality of second probability distributions associated with a second mixture distribution, wherein each of the plurality of second probability distributions associated with the second interference report is based at least in part on the second type of base distribution indicated by the switching indication.

Aspect 10: The method of any of aspects 1 through 9, wherein: a type of a base distribution for the mixture distribution is a Gaussian type; and the respective set of one or more distribution parameters for each probability distribution of the plurality of probability distributions comprises a respective mean, a respective covariance matrix, a respective weight, or any combination thereof associated with the probability distribution.

Aspect 11: The method of aspect 10, wherein the respective covariance matrix indicates an interference correlation across one or more dimensions, the one or more dimensions associated with antenna ports, antenna elements, time, frequency, or any combination thereof.

Aspect 12: The method of any of aspects 1 through 9, wherein: a type of a base distribution for the mixture distribution is an inverse Gaussian type; and the respective set of one or more distribution parameters for each probability distribution of the plurality of probability distributions comprises a respective mean, a respective shape, a respective weight, or any combination thereof associated with the probability distribution.

Aspect 13: The method of any of aspects 1 through 9, wherein: a type of a base distribution for the mixture distribution is an inverse Weibull type; and the respective set of one or more distribution parameters for each probability distribution of the plurality of probability distributions comprises a respective shape, a respective scale, a respective weight, or any combination thereof associated with the probability distribution.

Aspect 14: A method for wireless communication at a network entity, comprising: transmitting a plurality of signals via a plurality of interference measurement resources for a wireless communication channel; receiving an interference report that indicates a respective set of one or more distribution parameters for each probability distribution of a plurality of probability distributions, wherein the plurality of probability distributions are components of a mixture distribution that is representative of interference at a UE, and wherein the respective sets of one or more distribution parameters are based at least in part on a plurality of interference measurements of the plurality of interference measurement resources; and transmitting one or more wireless communications based at least in part on the interference report and the mixture distribution.

Aspect 15: The method of aspect 14, further comprising: receiving a capability message that indicates a mixture distribution reporting capability of the UE, wherein the respective sets of one or more distribution parameters associated with the mixture distribution are based at least in part on the mixture distribution reporting capability of the UE.

Aspect 16: The method of aspect 15, wherein receiving the capability message comprises: receiving an indication of one or more types of base distributions associated with the mixture distribution reporting capability of the UE, the one or more types of base distributions comprising a Gaussian distribution, an inverse Gaussian distribution, an inverse Weibull distribution, or any combination thereof, wherein each of the plurality of probability distributions is based at least in part on a type of base distribution included in the one or more types of base distributions indicated via the capability message.

Aspect 17: The method of any of aspects 15 through 16, wherein receiving the capability message comprises: receiving an indication of a maximum quantity of components within a single mixture distribution associated with the mixture distribution reporting capability of the UE, wherein a quantity of probability distributions within the plurality of probability distributions is less than or equal to the maximum quantity of components indicated by the capability message.

Aspect 18: The method of any of aspects 14 through 17, further comprising: transmitting a control message comprising a mixture distribution reporting configuration for the UE, wherein the respective sets of one or more distribution parameters associated with the mixture distribution are based at least in part on the mixture distribution reporting configuration.

Aspect 19: The method of aspect 18, further comprising: determining the mixture distribution reporting configuration based at least in part on a location of the UE within a cell, an interference pattern associated with the UE, a bandwidth available for interference reporting, or any combination thereof.

Aspect 20: The method of any of aspects 18 through 19, wherein: the mixture distribution reporting configuration indicates one or more types of base distributions for the mixture distribution, the one or more types of base distributions comprising a Gaussian distribution, an inverse Gaussian distribution, an inverse Weibull distribution, or any combination thereof; and each of the plurality of probability distributions associated with the interference report is based at least in part on a type of base distribution included in the one or more types of base distributions indicated by the mixture distribution reporting configuration.

Aspect 21: The method of any of aspects 18 through 20, wherein: the mixture distribution reporting configuration indicates a maximum quantity of components within a single mixture distribution; and a quantity of probability distributions within the plurality of probability distributions is less than or equal to the maximum quantity of components indicated by the mixture distribution reporting configuration.

Aspect 22: The method of any of aspects 18 through 21, wherein the mixture distribution reporting configuration indicates a minimum weight for a component of the mixture distribution, and wherein receiving the interference report comprises: receiving, within each respective set of one or more distribution parameters in the interference report, a respective weight for a corresponding probability distribution of the plurality of probability distributions, wherein the respective weight for each probability distribution of the plurality of probability distributions is greater than or equal to the minimum weight indicated by the mixture distribution reporting configuration.

Aspect 23: The method of any of aspects 14 through 22, further comprising: receiving a message comprising a switching indication associated with a switch from a first type of base distribution to a second type of base distribution; and receiving a second interference report that indicates a respective second set of one or more second distribution parameters for each second probability distribution of a plurality of second probability distributions associated with a second mixture distribution, wherein each of the plurality of second probability distributions associated with the second interference report is based at least in part on the second type of base distribution indicated by the switching indication.

Aspect 24: The method of any of aspects 14 through 23, wherein: a type of a base distribution for the mixture distribution is a Gaussian type; and the respective set of one or more distribution parameters for each probability distribution of the plurality of probability distributions comprises a respective mean, a respective covariance matrix, a respective weight, or any combination thereof associated with the probability distribution.

Aspect 25: The method of any of aspects 14 through 23, wherein: a type of a base distribution for the mixture distribution is an inverse Gaussian type or an inverse Weibull type; and the respective set of one or more distribution parameters for each probability distribution of the plurality of probability distributions comprises a respective mean, a respective shape, a respective scale, a respective weight, or any combination thereof associated with the probability distribution.

Aspect 26: An apparatus for wireless communication at a UE, comprising a processor; memory coupled with the processor; and instructions stored in the memory and executable by the processor to cause the apparatus to perform a method of any of aspects 1 through 13.

Aspect 27: An apparatus for wireless communication at a UE, comprising at least one means for performing a method of any of aspects 1 through 13.

Aspect 28: A non-transitory computer-readable medium storing code for wireless communication at a UE, the code comprising instructions executable by a processor to perform a method of any of aspects 1 through 13.

Aspect 29: An apparatus for wireless communication at a network entity, comprising a processor; memory coupled with the processor; and instructions stored in the memory and executable by the processor to cause the apparatus to perform a method of any of aspects 14 through 25.

Aspect 30: An apparatus for wireless communication at a network entity, comprising at least one means for performing a method of any of aspects 14 through 25.

Aspect 31: A non-transitory computer-readable medium storing code for wireless communication at a network entity, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions. Also, as used herein, the phrase "a set" shall be construed as including the possibility of a set with one member. That is, the phrase "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more memories storing processor-executable code; and
   one or more processors coupled with the one or more memories and individually or collectively operable to execute the code to cause the UE to:
     receive a control message comprising a mixture distribution reporting configuration for the UE;
     obtain a plurality of interference measurements for a wireless communication channel;
     transmit, based at least in part on the mixture distribution reporting configuration, an interference report that indicates a respective set of one or more distribution parameters for each probability distribution of a plurality of probability distributions, wherein the plurality of probability distributions are components of a mixture distribution that is representative of interference at the UE, and wherein the respective sets of one or more distribution parameters are based at least in part on the plurality of interference measurements; and
     receive one or more wireless communications based at least in part on the interference report and the mixture distribution.

2. The UE of claim 1, wherein the one or more processors are individually or collectively further operable to execute the code to cause the UE to:
   transmit a capability message that indicates a mixture distribution reporting capability of the UE, wherein transmitting the interference report that indicates the respective sets of one or more distribution parameters associated with the mixture distribution is based at least in part on the mixture distribution reporting capability of the UE.

3. The UE of claim 2, wherein, to transmit the capability message, the one or more processors are individually or collectively further operable to execute the code to cause the UE to:
   transmit an indication of one or more types of base distributions associated with the mixture distribution reporting capability of the UE, the one or more types of base distributions comprising a Gaussian distribution, an inverse Gaussian distribution, an inverse Weibull distribution, or any combination thereof, wherein each of the plurality of probability distributions is based at least in part on a type of base distribution included in the one or more types of base distributions indicated via the capability message.

4. The UE of claim 2, wherein, to transmit the capability message, the one or more processors are individually or collectively further operable to execute the code to cause the UE to:
   transmit an indication of a maximum quantity of components within a single mixture distribution associated with the mixture distribution reporting capability of the UE, wherein a quantity of probability distributions within the plurality of probability distributions is less than or equal to the maximum quantity of components indicated by the capability message.

5. The UE of claim 1, wherein:
   the mixture distribution reporting configuration indicates one or more types of base distributions for the mixture distribution, the one or more types of base distributions comprising a Gaussian distribution, an inverse Gaussian distribution, an inverse Weibull distribution, or any combination thereof; and
   each of the plurality of probability distributions associated with the interference report is based at least in part on a type of base distribution included in the one or more types of base distributions indicated by the mixture distribution reporting configuration.

6. The UE of claim 1, wherein:
   the mixture distribution reporting configuration indicates a maximum quantity of components within a single mixture distribution; and
   a quantity of probability distributions within the plurality of probability distributions is less than or equal to the maximum quantity of components indicated by the mixture distribution reporting configuration.

7. The UE of claim 1, wherein the mixture distribution reporting configuration indicates a minimum weight for a component of the mixture distribution, and wherein, to transmit the interference report, the one or more processors are individually or collectively further operable to execute the code to cause the UE to:
   transmit, within each respective set of one or more distribution parameters in the interference report, a respective weight for a corresponding probability distribution of the plurality of probability distributions, wherein the respective weight for each probability distribution of the plurality of probability distributions is greater than or equal to the minimum weight indicated by the mixture distribution reporting configuration.

8. The UE of claim 1, wherein the one or more processors are individually or collectively further operable to execute the code to cause the UE to:
   transmit a message comprising a switching indication associated with a switch from a first type of base distribution to a second type of base distribution; and
   transmit a second interference report that indicates a respective second set of one or more second distribution parameters for each second probability distribution of a plurality of second probability distributions associated with a second mixture distribution, wherein each of the plurality of second probability distributions associated with the second interference report is based at least in part on the second type of base distribution indicated by the switching indication.

9. The UE of claim 1, wherein:
   a type of a base distribution for the mixture distribution is a Gaussian type; and the respective set of one or more distribution parameters for each probability distribution of the plurality of probability distributions comprises a respective mean, a respective covariance matrix, a respective weight, or any combination thereof associated with the probability distribution.

10. The UE of claim 9, wherein the respective covariance matrix indicates an interference correlation across one or more dimensions, the one or more dimensions associated with antenna ports, antenna elements, time, frequency, or any combination thereof.

11. The UE of claim 1, wherein:
a type of a base distribution for the mixture distribution is an inverse Gaussian type; and
the respective set of one or more distribution parameters for each probability distribution of the plurality of probability distributions comprises a respective mean, a respective shape, a respective weight, or any combination thereof associated with the probability distribution.

12. The UE of claim 1, wherein:
a type of a base distribution for the mixture distribution is an inverse Weibull type; and
the respective set of one or more distribution parameters for each probability distribution of the plurality of probability distributions comprises a respective shape, a respective scale, a respective weight, or any combination thereof associated with the probability distribution.

13. A network entity, comprising:
one or more memories storing processor-executable code; and
one or more processors coupled with the one or more memories and individually or collectively operable to execute the code to cause the network entity to:
transmit a control message comprising a mixture distribution reporting configuration for a user equipment (UE);
transmit a plurality of signals via a plurality of interference measurement resources for a wireless communication channel;
receive an interference report that indicates a respective set of one or more distribution parameters for each probability distribution of a plurality of probability distributions, wherein the plurality of probability distributions are components of a mixture distribution that is representative of interference at a user equipment (UE), and wherein the respective sets of one or more distribution parameters are based at least in part on the mixture distribution reporting configuration and a plurality of interference measurements of the plurality of interference measurement resources; and
transmit one or more wireless communications based at least in part on the interference report and the mixture distribution.

14. The network entity of claim 13, wherein the one or more processors are individually or collectively further operable to execute the code to cause the network entity to:
receive a capability message that indicates a mixture distribution reporting capability of the UE, wherein the respective sets of one or more distribution parameters associated with the mixture distribution are based at least in part on the mixture distribution reporting capability of the UE.

15. The network entity of claim 14, wherein, to receive the capability message, the instructions are executable by the processor to cause the apparatus to:
receive an indication of one or more types of base distributions associated with the mixture distribution reporting capability of the UE, the one or more types of base distributions comprising a Gaussian distribution, an inverse Gaussian distribution, an inverse Weibull distribution, or any combination thereof, wherein each of the plurality of probability distributions is based at least in part on a type of base distribution included in the one or more types of base distributions indicated via the capability message.

16. The network entity of claim 14, wherein, to receive the capability message, the instructions are executable by the processor to cause the apparatus to:
receive an indication of a maximum quantity of components within a single mixture distribution associated with the mixture distribution reporting capability of the UE, wherein a quantity of probability distributions within the plurality of probability distributions is less than or equal to the maximum quantity of components indicated by the capability message.

17. The network entity of claim 13, wherein the instructions are further executable by the processor to cause the apparatus to:
determine the mixture distribution reporting configuration based at least in part on a location of the UE within a cell, an interference pattern associated with the UE, a bandwidth available for interference reporting, or any combination thereof.

18. The network entity of claim 13, wherein:
the mixture distribution reporting configuration indicates one or more types of base distributions for the mixture distribution, the one or more types of base distributions comprising a Gaussian distribution, an inverse Gaussian distribution, an inverse Weibull distribution, or any combination thereof; and
each of the plurality of probability distributions associated with the interference report is based at least in part on a type of base distribution included in the one or more types of base distributions indicated by the mixture distribution reporting configuration.

19. The network entity of claim 13, wherein:
the mixture distribution reporting configuration indicates a maximum quantity of components within a single mixture distribution; and
a quantity of probability distributions within the plurality of probability distributions is less than or equal to the maximum quantity of components indicated by the mixture distribution reporting configuration.

20. The network entity of claim 13, wherein the mixture distribution reporting configuration indicates a minimum weight for a component of the mixture distribution, and wherein, to receive the interference report, the one or more processors are individually or collectively further operable to execute the code to cause the network entity to:
receive, within each respective set of one or more distribution parameters in the interference report, a respective weight for a corresponding probability distribution of the plurality of probability distributions, wherein the respective weight for each probability distribution of the plurality of probability distributions is greater than or equal to the minimum weight indicated by the mixture distribution reporting configuration.

21. The network entity of claim 13, wherein the one or more processors are individually or collectively further operable to execute the code to cause the network entity to:
receive a message comprising a switching indication associated with a switch from a first type of base distribution to a second type of base distribution; and
receive a second interference report that indicates a respective second set of one or more second distribution parameters for each second probability distribution of a plurality of second probability distributions associated with a second mixture distribution, wherein each of the plurality of second probability distributions associated with the second interference report is based at least in part on the second type of base distribution indicated by the switching indication.

22. The network entity of claim 13, wherein:
a type of a base distribution for the mixture distribution is a Gaussian type; and
the respective set of one or more distribution parameters for each probability distribution of the plurality of probability distributions comprises a respective mean, a respective covariance matrix, a respective weight, or any combination thereof associated with the probability distribution.

23. The network entity of claim 13, wherein:
a type of a base distribution for the mixture distribution is an inverse Gaussian type or an inverse Weibull type; and
the respective set of one or more distribution parameters for each probability distribution of the plurality of probability distributions comprises a respective mean, a respective shape, a respective scale, a respective weight, or any combination thereof associated with the probability distribution.

24. A method for wireless communication at a user equipment (UE), comprising:
receiving a control message comprising a mixture distribution reporting configuration for the UE;
obtaining a plurality of interference measurements for a wireless communication channel;
transmitting, based at least in part on the mixture distribution reporting configuration, an interference report that indicates a respective set of one or more distribution parameters for each probability distribution of a plurality of probability distributions, wherein the plurality of probability distributions are components of a mixture distribution that is representative of interference at the UE, and wherein the respective sets of one or more distribution parameters are based at least in part on the plurality of interference measurements; and
receiving one or more wireless communications based at least in part on the interference report and the mixture distribution.

25. The method of claim 24, further comprising:
transmitting a capability message that indicates a mixture distribution reporting capability of the UE, wherein transmitting the interference report that indicates the respective sets of one or more distribution parameters associated with the mixture distribution is based at least in part on the mixture distribution reporting capability of the UE.

26. A method for wireless communication at a network entity, comprising:
transmitting a control message comprising a mixture distribution reporting configuration for a user equipment (UE);
transmitting a plurality of signals via a plurality of interference measurement resources for a wireless communication channel;
receiving an interference report that indicates a respective set of one or more distribution parameters for each probability distribution of a plurality of probability distributions, wherein the plurality of probability distributions are components of a mixture distribution that is representative of interference at a user equipment (UE), and wherein the respective sets of one or more distribution parameters are based at least in part on the mixture distribution reporting configuration and a plurality of interference measurements of the plurality of interference measurement resources; and
transmitting one or more wireless communications based at least in part on the interference report and the mixture distribution.

27. The method of claim 26, further comprising:
receiving a capability message that indicates a mixture distribution reporting capability of the UE, wherein the respective sets of one or more distribution parameters associated with the mixture distribution are based at least in part on the mixture distribution reporting capability of the UE.

* * * * *